(12) United States Patent
Sundaresan et al.

(10) Patent No.: US 12,175,220 B2
(45) Date of Patent: Dec. 24, 2024

(54) CODE INSERTION COMPLETION

(71) Applicant: MICROSOFT TECHNOLOGY LICENSING, LLC., Redmond, WA (US)

(72) Inventors: Neelakantan Sundaresan, Bellevue, WA (US); Alexey Svyatkovskiy, Bellevue, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 198 days.

(21) Appl. No.: 17/842,725

(22) Filed: Jun. 16, 2022

(65) Prior Publication Data

US 2023/0409299 A1    Dec. 21, 2023

(51) Int. Cl.
G06F 8/41    (2018.01)
G06F 8/33    (2018.01)

(52) U.S. Cl.
CPC .............. G06F 8/427 (2013.01); G06F 8/33 (2013.01)

(58) Field of Classification Search
CPC ................................... G06F 8/427; G06F 8/33
See application file for complete search history.

(56) References Cited

U.S. PATENT DOCUMENTS

| | | | |
|---|---|---|---|
| 6,799,718 B2 | 10/2004 | Chan et al. | |
| 8,732,660 B2 | 5/2014 | Neill et al. | |
| 10,635,414 B2 | 4/2020 | Gulwani et al. | |
| 11,340,898 B1 | 5/2022 | Sabharwal et al. | |
| 11,442,702 B2 | 9/2022 | Smith et al. | |
| 11,861,333 B2* | 1/2024 | Tabachnyk | G06F 8/33 |
| 2014/0282375 A1 | 9/2014 | Gulwani et al. | |
| 2018/0349106 A1* | 12/2018 | Makkar | G06F 8/36 |
| 2019/0205763 A1 | 7/2019 | Hirano | |
| 2019/0220253 A1 | 7/2019 | Pradhan et al. | |
| 2019/0228319 A1 | 7/2019 | Gupta et al. | |
| 2019/0303107 A1* | 10/2019 | Kelly | G06F 9/453 |
| 2019/0391792 A1 | 12/2019 | Sabharwal et al. | |
| 2020/0097261 A1* | 3/2020 | Smith | G06F 40/174 |
| 2020/0104102 A1 | 4/2020 | Brockschmidt et al. | |

(Continued)

FOREIGN PATENT DOCUMENTS

WO    2021021322 A2    2/2021

OTHER PUBLICATIONS

Yasir Hussain, Improving source code suggestion with code embedding and enhanced convolutional long short-term memory, IET Software, Mar. 2021 (Year: 2021).*

(Continued)

*Primary Examiner* — Wei Y Zhen
*Assistant Examiner* — Amir Soltanzadeh

(57) ABSTRACT

A code insertion engine predicts one or more statements of a programming language to be inserted at an insertion point in between existing source code statements of a source code program being edited. The code insertion engine extracts the surrounding context of the insertion point which includes the source code immediately preceding and the source code immediately following the insertion point. The code insertion engine uses a neural expansion model and a neural selector model to predict the one or more statements most likely to be inserted into the insertion point that are syntactically and semantically consistent with the surrounding context of the existing program.

20 Claims, 13 Drawing Sheets

(56) References Cited

U.S. PATENT DOCUMENTS

| | | |
|---|---|---|
| 2020/0249918 A1 | 8/2020 | Svyatkovskiy et al. |
| 2021/0026605 A1 | 1/2021 | Evangelopoulos et al. |
| 2021/0034335 A1 | 2/2021 | Svyatkovskiy et al. |
| 2021/0349696 A1* | 11/2021 | Nupponen ............... G06F 8/33 |
| 2021/0357187 A1 | 11/2021 | Clement et al. |
| 2022/0374208 A1 | 11/2022 | Allamanis et al. |
| 2022/0398071 A1 | 12/2022 | Allamanis et al. |
| 2023/0393817 A1* | 12/2023 | Johnson ................ G06N 20/00 |

OTHER PUBLICATIONS

Ginzberg, et al., "Automatic Code Completion", Computer Science Department, Stanford University, 2017, 10 Pages.

Non-Final Office Action mailed on Nov. 16, 2023, in U.S. Appl. No. 17/321,414, 20 pages.

Office Action Received for European Application No. 22723298.0, mailed on Dec. 22, 2023, 3 pages.

Wang, et al., "Towards Full-line Code Completion with Neural Language Models", arXiv preprint arXiv:2009.08603, Sep. 18, 2020, 7 Pages.

"Notice of Allowance Issued in U.S. Appl. No. 17/403,583", Mailed Date: Jul. 26, 2023, 9 Pages.

Chakraborty, et al., "CODIT: Code Editing with Tree-Based Neural Models", In Repository of arXiv:1810.00314v3, Aug. 25, 2020, pp. 1-14.

Notice of Allowance mailed on Mar. 12, 2024, in U.S. Appl. No. 17/321,414, 14 pages.

Brockschmidt, et al., "Generative Code Modeling with Graphs", In the Repository of arXiv:1805.08490v2, Apr. 16, 2019, 24 Pages.

"International Search Report and Written Opinion Issued in PCT Application No. PCT/US22/026082", Mailed Date: Jul. 19, 2022, 15 Pages.

Le, et al., "Deep Learning for Source Code Modeling and Generation: Models, Applications and Challenges", In Repository of arXiv:2002.05442v1, Feb. 13, 2020, 37 Pages.

"International Search Report and Written Opinion Issued in PCT Application No. PCT/US22/028874", Mailed Date: Aug. 31, 2022, 15 Pages.

Mukherjee, et al., "Searching a Database of Source Codes Using Contextualized Code Search", In Repository of arXiv:2001.03277v1, Jan. 10, 2020, 15 Pages.

"International Search Report and Written Opinion Issued in PCT Application No. PCT/US23/022444", Mailed Date: Aug. 9, 2023, 11 Pages.

Allamanis, et al., "Mining Idioms from Source Code", In Proceedings of the 22nd ACM International Symposium on Foundations of Software Engineering, Nov. 16, 2014, pp. 472-483.

Allamanis, Miltiadis, "The Adverse Effects of Code Duplication in Machine Learning Models of Code", In Proceedings of the ACM SIGPLAN International Symposium on New Ideas, New Paradigms, and Reflections on Programming and Software, Oct. 23, 2019, pp. 143-153.

Bahdanau, et al., "Neural Machine Translation by Jointly Learning to Align and Translate", In Proceedings of 3rd International Conference on Learning Representations, May 7, 2015, 15 Pages.

Beltagy,, et al., "Longformer: The long-document transformer", In Repository of arXiv:2004.05150v2, Dec. 2, 2020, pp. 1-17.

Bielik, et al., "PHOG: Probabilistic Model for Code", In Proceedings of the 33rd International Conference on Machine Learning, Jun. 19, 2016, 10 Pages.

Casalnuovo, et al., "Studying the difference between natural and programming language corpora", In Journal of Empirical Software Engineering, vol. 24, Issue 4, Aug. 24, 2019, pp. 1-38.

Cohen, et al., "Spectral Learning of Latent-Variable PCFGs", In Proceedings of the 50th Annual Meeting of the Association for Computational Linguistics (vol. 1: Long Papers), Jul. 8, 2012, pp. 223-231.

Dong, et al., "Coarse-to-Fine Decoding for Neural Semantic Parsing", In Repository of arXiv:1805.04793, May 12, 2018, 12 Pages.

Feng, et al., "CodeBERT: A Pre-Trained Model for Programming and Natural Languages", In Repository of arXiv:2002.08155v4, Sep. 18, 2020, 12 Pages.

Ford, et al., "The Importance of Generation Order in Language Modeling", In Repository of arXiv:1808.07910, Aug. 23, 2018, 6 Pages.

Gu, et al., "Levenshtein Transformer", In Repository of arXiv:1905.11006v1, May 27, 2019, 16 Pages.

Guo, et al., "Learning to Generate Code Sketches", In Repository of arXiv:2106.10158v1, Jun. 18, 2021, pp. 1-22.

Hellendoorn, et al., "Global Relational Models of Source Code", In Proceedings of International Conference on Learning Representations, Sep. 26, 2019, 12 Pages.

Hindle, et al., "On the Naturalness of Software", In Proceedings of the 34th International Conference on Software Engineering, Jun. 2, 2012, pp. 837-847.

Hovitz, Eric, "Principles of Mixed-Initiative User Interfaces", In Proceedings of the ACM SIGCHI Conference on Human Factors in Computing Systems, May 15, 1999, pp. 159-166.

Karampatsis, et al., "Big Code != Big Vocabulary: Open-Vocabulary Models for Source Code", In Proceedings of IEEE/ACM 42nd International Conference on Software Engineering (ICSE), May 23, 2020, pp. 1073-1085.

Kim, et al., "Code prediction by feeding trees to transformers", In Proceedings of IEEE/ACM 43rd International Conference on Software Engineering, May 22, 2021, 13 Pages.

Lee, et al., "Deterministic non-autoregressive neural sequence modeling by iterative refinement", In Repository of arXiv:1802.06901v3, Aug. 27, 2018, 11 Pages.

Lewis, et al., "BART: Denoising Sequence-to-Sequence Pre-training for Natural Language Generation, Translation, and Comprehension", In Repository of arXiv:1910.13461v1, Oct. 29, 2019, 10 Pages.

Lin, Chin-Yew, "Rouge: A package for automatic evaluation of summaries", In Proceedings of the Workshop on Text Summarization Branches Out, Jan. 2004, 8 Pages.

Liu, et al., "A Token-level Reference-free Hallucination Detection Benchmark for Free-form Text Generation", In Repository of arXiv:2104.08704, Apr. 18, 2021, 14 Pages.

Liu, et al., "Neural Code Completion", In Proceedings of 5th International Conference on Learning Representations, Apr. 2017, pp. 1-14.

Lopes, et al., "DéjàVu: A Map of Code Duplicates on GitHub", In Proceedings of the ACM on Programming Languages, vol. 1, Oct. 2017, 28 Pages.

Maddison, et al., "Structured Generative Models of Natural Source Code", In Proceedings of the 31st International Conference on Machine Learning, Jun. 21, 2014, 9 Pages.

Malmi, et al., "Encode, tag, realize: High precision text editing", In Repository of arXiv:1909.01187v1, Sep. 3, 2019, 14 Pages.

Maynez, et al., "On faithfulness and factuality in abstractive summarization", In Repository of arXiv:2005.00661v1, May 2, 2020, 14 Pages.

Mens, et al., "Using Annotated Grammars for the Automated Generation of Program Transformers", In Proceedings of the 3rd Days on Model-Driven Engineering, Nov. 13, 2006, 16 Pages.

Nye, et al., "Learning to Infer Program Sketches", In Proceedings of the 36th International Conference on Machine Learning, Jun. 9, 2019, 10 Pages.

Parisotto, et al., "Neuro-Symbolic Program Synthesis", In Proceedings of 5th International Conference on Learning Representations, ICLR 2017, Apr. 24, 2017, 14 Pages.

Paulus, et al., "A Deep Reinforced Model for Abstractive Summarization", In Repository of arxiv:1705.04304v1, May 11, 2017, 10 Pages.

Puduppully, "Data-to-Text Generation with Content Selection and Planning", In Proceedings of the AAAI Conference on Artificial Intelligence, vol. 33, No. 01, Jul. 17, 2019, pp. 6908-6915.

Rennie, et al., "Self-critical sequence training for image captioning", In repository of arXiv:1612.00563v2, Nov. 16, 2017, 16 Pages.

(56) References Cited

OTHER PUBLICATIONS

Sennrich, et al., "Neural Machine Translation of Rare Words with Subword Units", In Repository of arXiv:1508.07909v2, Nov. 27, 2015, 11 Pages.

Shah, et al., "Generating sentences using a dynamic canvas", In Proceedings of the AAAI Conference on Artificial Intelligence, vol. 32, Apr. 27, 2018, pp. 5430-5437.

Shenwai, Tanushree, "OpenAI Releases New Version of GPT-3 and Codex That Can Edit or Insert Content Into Existing Text", Retrieved from: https://www.marktechpost.com/2022/03/21/openai-releases-new-version-of-gpt-3-and-codex-that-can-edit-or-insert-content-into-existing-text%EF%BF%BC/, Mar. 21, 2022, 3 Pages.

Shum, et al., "Sketch-Fill-AR: A persona grounded chit-chat generation framework", In Repository of arXiv:1910.13008v1, Oct. 28, 2019, 10 Pages.

Stern, et al., "Insertion transformer: Flexible sequence generation via insertion operations", In Repository of arXiv:1902.03249v1, Feb. 8, 2019, 10 Pages.

Svyatkovskiy, et al., "IntelliCode Compose: Code Generation using Transformer", In Proceedings of the 28th ACM Joint Meeting on European Software Engineering Conference and Symposium on the Foundations of Software Engineering, Nov. 8, 2020, 1433-1443.

Svyatkovskiy, et al., "Pythia: AI-assisted Code Completion System", In Proceedings of the 25th ACM SIGKDD International Conference on Knowledge Discovery & Data Mining, Aug. 4, 2019, pp. 2727-2735.

Vaswani, et al., "Attention is All You Need", In Proceedings of 31st Conference on Neural Information Processing Systems, Dec. 4, 2017, 11 Pages.

Wang, et al., "RAT-SQL: Relation-aware schema encoding and linking for text-to-SQL parsers.", In Repository of arXiv:1911.04942v1, Nov. 10, 2019, 10 Pages.

Welleck, et al., "Non-monotonic sequential text generation", In Repository of arXiv:1902.02192v3, Oct. 23, 2019, 21 Pages.

Yin, et al., "A syntactic neural model for general-purpose code generation", In Proceedings of the 55th Annual Meeting of the Association for Computational Linguistics, vol. 1, Jul. 30, 2017, 14 Pages.

Ziyin, et al., "Deep Gamblers: Learning to Abstain with Portfolio Theory", In Repository of arXiv:1907.00208v2, Oct. 1, 2019, pp. 1-17.

Notice of Allowance mailed on Sep. 4, 2024, in U.S. Appl. No. 18/386,934, 8 pages.

* cited by examiner

```
200
201    <start> <statement><stop>
202         <start> <expression_statement><stop>
203    <start><left><stop> <start><assignment_operator><stop><start> <right><stop>;
204    <start> <left><stop>                             =                    <start> <right><stop>;
205    <start><identifier><stop>                        =                    <start> <right><stop>;
206    <start><identifier><stop>                        =                    <start><expression> <stop>[ <start><argument><stop> ];
207    <start><identifier><stop>                        =                                         [ <start><argument> <stop>];
208    <start><identifier><stop>                        =                    <start><identifier><stop>  [ <start><argument><stop> ];
209    <start><identifier><stop>                        =                    resetParameters           [ <start><string_literal><stop> ];
210         MinScale                                    =                    resetParameters           [ <start><string_literal><stop> ];
211         MinScale                                    =                    resetParameters           [     "min_scale"               ];
              <statement>
212         MinScale = resetParameters [ "min_scale" ] ;
              <expression_statement>
213         MinScale = resetParameters [ "min_scale" ] ;
214    <start> <left><stop><start><assignment_operator><stop><start> <right><stop>;
         MinScale = resetParameters [ "min_scale" ] ;
         <start> <left><stop>                             =                    <start><right><stop>;
215    MinScale = resetParameters [ "min_scale" ] ;
         <start> <identifier><stop>                       =                    <start><right><stop>;
216    MinScale = resetParameters [ "min_scale" ] ;
         <start> <identifier><stop>                       =                    <start> <expression><stop>[<start> <argument> <stop>] ;
217    MinScale = resetParameters [ "min_scale" ] ;
         <start><identifier><stop>                        =                                            [ <start><argument> <stop>] ;
218    MinScale = resetParameters [ "min_scale" ] ;
         <start> <identifier><stop>                       =                    resetParameters         [ <start><argument> <stop>] ;
219    MinScale = resetParameters [ "min_scale" ] ;
         <start> <identifier><stop>                       =                    resetParameters         [ <start><string_literal><stop> ] ;
220    MinScale = resetParameters [ "min_scale" ] ;
         MaxDistance                                      =                    resetParameters         [ <start><string_literal><stop> ] ;
221    MinScale                                           =                    resetParameters         [ "min_scale" ] ;
222    MaxDistance                                        =                    resetParameters         [ "max_distance" ] ;
              <stop>
```

FIG. 2

CODE INSERTION COMPLETION

BACKGROUND

Software development environments are often used to aid software developers (i.e., users, programmers, etc.) to develop program code. The software development environment may include a source code editor and other tools that a developer utilizes to write, edit and/or test their programs. Some software development environments include a code completion feature that provides assistance while the developer is editing code by automatically presenting a list of possible candidates based on one or more characters (e.g., letters, symbols, etc.) that a developer has typed into a source code editor.

Typically, the code completion feature completes a partially-formed code element based on the context that precedes the current cursor position. The context may include a few characters that start a method invocation, a variable name, or other code element. A popup menu may appear with several suggestions to complete the partially-formed code element. This assistance is beneficial since it speeds up the development time and reduces common errors, such as typos. However, the automatic code completion feature may be problematic when the developer aims to insert source code statements in between existing lines of code where dependencies exist in the usage of the existing code elements and the flow of control between the different code sections.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A code insertion engine predicts one or more source code statements to insert in between two existing source code segments of a source code program. The code insertion engine uses deep learning models to predict syntactically and semantically-correct source code statements given the surrounding context where the predicted statements are to be inserted at an insertion point.

The code insertion engine is a grammar-guided technique that relies on a non-terminal selector model to predict the positions of the most likely non-terminals in a code insertion state to expand and a non-terminal expansion model that predicts the most likely expansions for a selected non-terminal symbol. The code insertion engine uses the non-terminal selector model and the non-terminal expansion model to iteratively expand a code insertion state into an ordered sequence of terminal symbols that represent syntactically and semantically-correct source code statements to insert into the source code program at the insertion point.

The code insertion engine receives a code insertion state that includes a prefix, a single statement non-terminal symbol, and a suffix. The prefix is the source code immediately preceding the insertion point and the suffix is the source code immediately following the insertion point. A decoding engine iteratively expands the single statement non-terminal symbol using the predictions from the non-terminal selector model and the non-terminal expansion model into a sequence of terminal symbols that represents the source code statements to be inserted at the insertion point.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 2 is an illustration of an exemplary expansion of a statement non-terminal symbol for the source code shown in FIG. 1.

DETAILED DESCRIPTION

Overview

Figure 1:
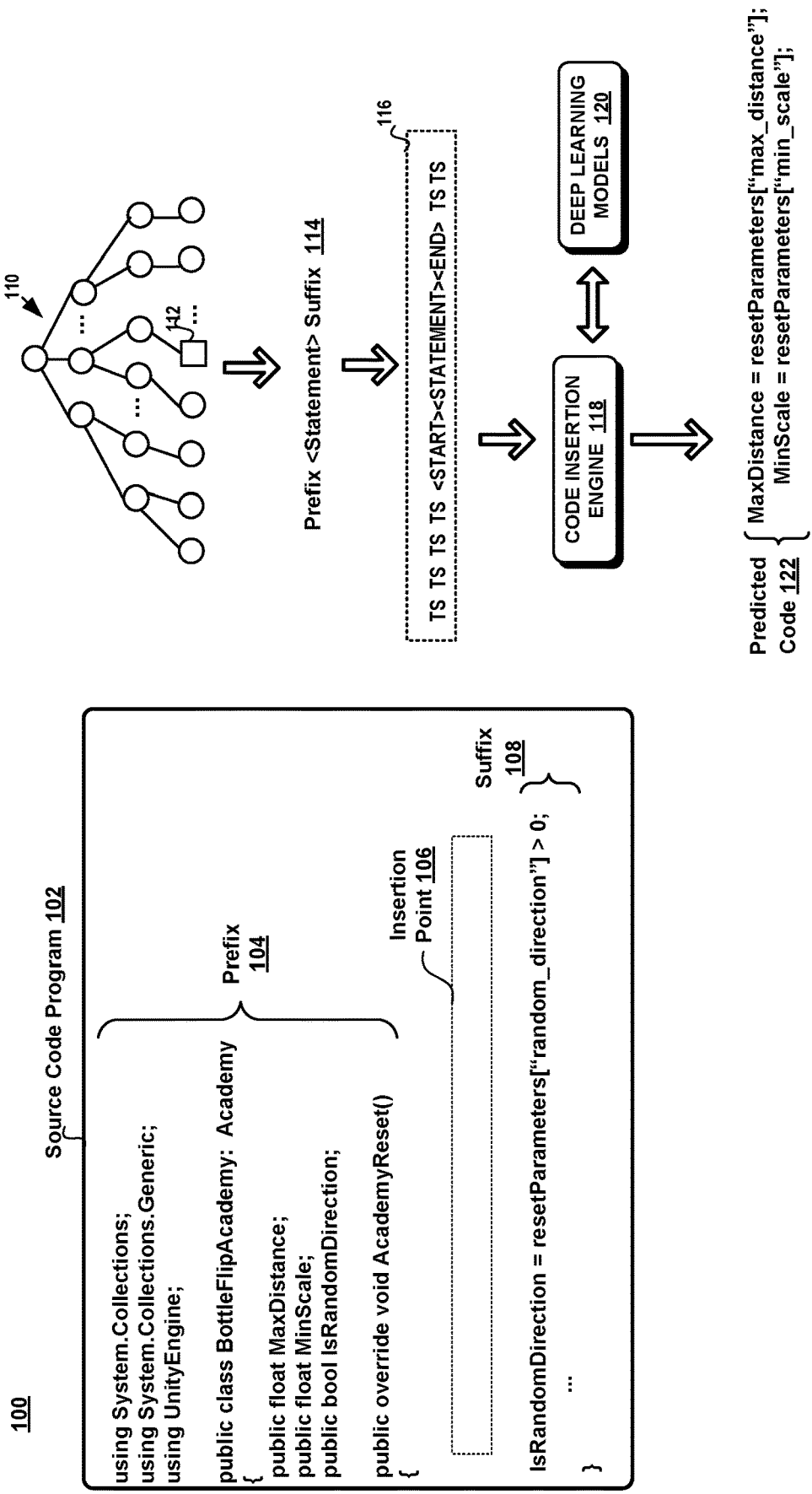
FIG. 1 is a schematic diagram representing the process of code insertion completion.

A code completion system predicts syntactically and semantically-correct source code statements to insert into an existing source code program based on the context that immediately precedes an insertion point and the context that immediately follows the insertion point. The insertion point represents a position in the source code program where the developer (i.e., user, client, etc.) intends to insert one or more source code statements in between existing source code segments. The code completion system predicts the source code statements that are likely to be included in the program at the insertion point that are consistent with the existing source code usage that precedes and follows the insertion point.

The technique described herein relies on the production rules of the grammar of a programming language to predict syntactically-correct code to insert into an existing program. Syntactically-correct code adheres to the grammar of a programming language. A context-free programming language relies on its context-free grammar to describe how to construct syntactically-correct source code. A context-free grammar, G, is defined by a 4-tuple, G=(V, T, R, S), where V is the set of non-terminal symbols, T is the set of terminal symbols, R is the set of production rules of the grammar, and S is the start non-terminal symbol used to represent the entire program. A terminal symbol is a symbol that appears in the strings generated by the grammar. A terminal symbol never appears on the left-hand side of a production rule and is always on the right-hand side. A non-terminal symbol is a placeholder for patterns of symbols that can be generated by the non-terminal symbols. A non-terminal symbol always appears on the left-side of a production rule. A production rule is a rule for replacing a non-terminal symbol. A grammar is context-free if a production rule can be applied regardless of the context of a non-terminal.

The technique described herein relies on two deep learning models to facilitate the prediction of the source code statements to insert into an existing program based on the context surrounding the insertion point. In one aspect, the deep learning models include a non-terminal selector model Ps and a non-terminal expansion model Pe. The non-terminal selector model is used to select the positions of the most likely non-terminals to expand and a non-terminal expansion model that predicts the most likely expansions for a selected non-terminal symbol. The non-terminal expansion model Pe is a neural transformer model with attention that autoregressively generates an insertion candidate given the non-terminal index to expand from the non-terminal selector model and a code state. A code state is an ordered sequence of terminal symbols and zero or more non-terminal symbols. The non-terminal selector model is a multilayer perceptron model that is pre-trained via reinforcement learning using a reward that is based on self-critical policy gradient learning using evaluation metrics given a code insertion state and the true terminal sequence.

When the models are deployed in a code completion system, a decoding engine uses the models to facilitate the selections and expansions of each non-terminal symbol one at a time without being constrained to a left-to-right expansion order. The decoding engine uses a nested beam search to generate the insertion candidates. The nested beam search consists of a selection phase and an expansion phase. The selection phase predicts the most likely non-terminal symbol to expand based on an output probability generated by the non-terminal selector model for each non-terminal symbol. The expansion phase expands the selected non-terminal symbols based on an output probability generated by the non-terminal expansion model for each production rule learned by the non-terminal expansion model.

A code state is a sequence of terminal symbols and/or non-terminal symbols derived from an expansion of a code insertion state. A code state is a partially-formed insertion candidate having zero or more unexpanded non-terminal symbols. The code states are expanded in the beam search until the code state reaches a symbol limit or the terminal symbols in the code state match the suffix.

FIG. 1 illustrates an exemplary code completion system 100 having a source code program 102 in an edit session. The edit session may be performed in a source code editor, integrated development environment ("IDE"), or other application. The source code program 102 contains several lines of source code. An insertion point 106 is detected where the developer may want to add in additional source code statements in between existing lines of source code. The insertion point 106 is a location in the source code where additional source code statements will be added. The additional lines of source code need to be consistent with the existing source code.

The insertion point is in the method AcademyReset( ) which is part of the class BottleFlipAcademy. The class BottleFlipAcademy defines the variables MaxDistance, MinScale, and IsRandomDistance. There is one source code statement in the method AcademyReset( ) which defines the variable IsRandomDirection. The developer wants to add source code before the IsRandomDirection variable definition statement.

The source code program is parsed into a concrete syntax tree 110 from which the prefix 104 and the suffix 108 are extracted. The prefix and the suffix consist of terminal symbols from the concrete syntax tree 110 that surround the insertion point. A single non-terminal symbol represents the non-terminal symbol that is to be inserted in between the prefix and the suffix. In one aspect, the single non-terminal symbol is of the type <statement>.

An input sequence 116 is formed that includes the non-terminal symbols of the prefix (TS TS TS TS), the single non-terminal symbol, <statements>, and the non-terminal symbols of the suffix (TS TS). A non-terminal symbol is represented as TS. The non-terminal symbol is preceded with a start symbol, <start>, and followed by a <stop> symbol. The input sequence 114 is transformed into a sequence of embeddings representing the non-terminal symbols of the prefix, the statement non-terminal symbol, and the non-terminal symbols of the suffix 116.

The code insertion engine 118 utilizes two deep learning models 120 to predict the most likely source code statements to insert at the insertion point 106 that is consistent with the source code that precedes and follows the insertion point 106. In this example, the code insertion engine 118 predicts the following two source code statements to insert into the program 122: MaxDistance=resetParameters["max_distance"]; and MinScale=resetParameters["min_scale"];

Both of these source code statements are syntactically-correct since they adhere to the grammar of the underlying programming language. They are semantically-correct since they utilize a consistent type usage with the existing source code. The statements utilize the variables MaxDistance and MinScale consistent with the existing definitions.

FIG. 2 illustrates the production rule expansion 200 for the <statement> non-terminal symbol shown in FIG. 1. In this example, the non-terminals are denoted within the < > brackets and the terminal symbols are denoted without the < > brackets. Each non-terminal symbol is preceded by a <start> symbol and followed by a <stop> symbol.

It should be noted that the grammar of each programming language differs and that a source code statement may consist of various types of statements. For example, in C# a statement consists of a single line of code that ends in a semicolon, or a series of single-line statements in a block. A statement block is enclosed in { } brackets and can contain nested blocks. The grammar of C# supports the following types of statements: declaration statement; expression statement; selection statement; iteration statement; jump statement; exception handling statement; checked and unchecked statement; await statement; yield return statement; fixed statement; lock statement; labeled statement; and an empty statement. By way of another example, C++ has the following statements: labeled statement; expression statement; compound statement; selection statement; iteration statement; jump statement; declaration statement; and a try-throw-catch statement.

A declaration statement introduces a new variable or constant that may be optionally assigned a value. An expression statement calculates a value that is stored in a variable. Selection statements facilitate branching to different sections of code based on a condition. Iteration statements loop through collections. Jump statements transfer control to another section of code. Exception handling statements recover from exceptional conditions. Checked and unchecked statements specify whether numerical operations are allowed to cause an overflow when a result is stored in a variable. The await statement suspends operation until an awaited task completes. The yield return statement returns each element of an iteration one at a time. The fixed statement prevents the garbage collector from relocating a movable variable. The lock statement limits access to blocks of code to only one thread at a time. A labeled statement jumps to the labeled statement. The empty statement consists of a single semicolon.

The code insertion engine starts with the non-terminal symbol for <statement> 201. The grammar for this programming language may include a production rule that expands the non-terminal symbol, <statement>, into the non-terminal symbol <expression_statement> 202. The non-terminal symbol <expression_statement> is expanded into the code state <left> <assignment_operator> <right> 203. A code state represents the current expansion of a partially-formed insertion candidate and includes a sequence of terminal symbols and zero or more non-terminal symbols.

The assignment operator is then expanded to the equal operator (=) resulting in the code state <left>=<right> 204. The <left> non-terminal is then expanded into the <identifier> non-terminal resulting in the code state <identifier>=<right> 205. The <right> non-terminal symbol is then expanded into <expression>[<argument>]; resulting in the code state <identifier>=<expression>[<argument>]; 206. The <expression> non-terminal symbol is expanded into the <identifier> non-terminal symbol resulting in the code state <identifier>=<identifier>[<argument>]; 207.

The second <identifier> non-terminal symbol is expanded into the terminal symbol resetParameters resulting in the code state <identifier>=resetParameters[<argument>]; 208. The <argument> non-terminal symbol is expanded into the <string_literal> non-terminal symbol resulting in the code state <identifier>=resetParameters[<string_literal>]; 209. The <identifier> non-terminal symbol is then expanded into the terminal symbol MinScale resulting in the code state MinScale=resetParameters[<string_literal>]; 210. The <string_literal> non-terminal symbol is expanded into the terminal symbol "min_scale" resulting in the code state MinScale=resetParameters["min_scale"] 211.

The process continues by decoding an additional <statement> until the stop symbol is reached 211. The additional <statement> is expanded into the non-terminal symbol <expression_statement> 212. The <expression_statement> non-terminal symbol is expanded into <left><assignment_operator><right> 213. The <assignment_operator> non-terminal symbol is expanded into the equal sign 214. The <left> non-terminal symbol is then expanded into the <identifier> non-terminal symbol 215. The <right> non-terminal symbol is expanded into the non-terminal symbols <expression>[<argument>]; 216. The <expression> non-terminal symbol is expanded into the <identifier> non-terminal symbol 217. The <identifier> non-terminal symbol is expanded into the terminal symbol resetParameters 218.

The <argument> non-terminal symbol is expanded into the non-terminal symbol <string_literal> 219. The <identifier> non-terminal symbol is expanded into the terminal symbol MaxDistance 220. The <string_literal> non-terminal symbol is expanded into the terminal symbol "max_distance" 221. The <stop> non-terminal symbol is encountered and the process stops 222.

As shown above, the expansion of the non-terminal symbols is not performed in a strict left-to-right order. Instead, the deep learning models determine the most likely non-terminal symbol to expand and the production rules that expand the non-terminal symbols without being constrained to a left-to-right expansion order.

Attention now turns to a further discussion of the system, devices, components, and methods utilized in the code insertion completion.

System for Code Insertion Completion

Figure 3:
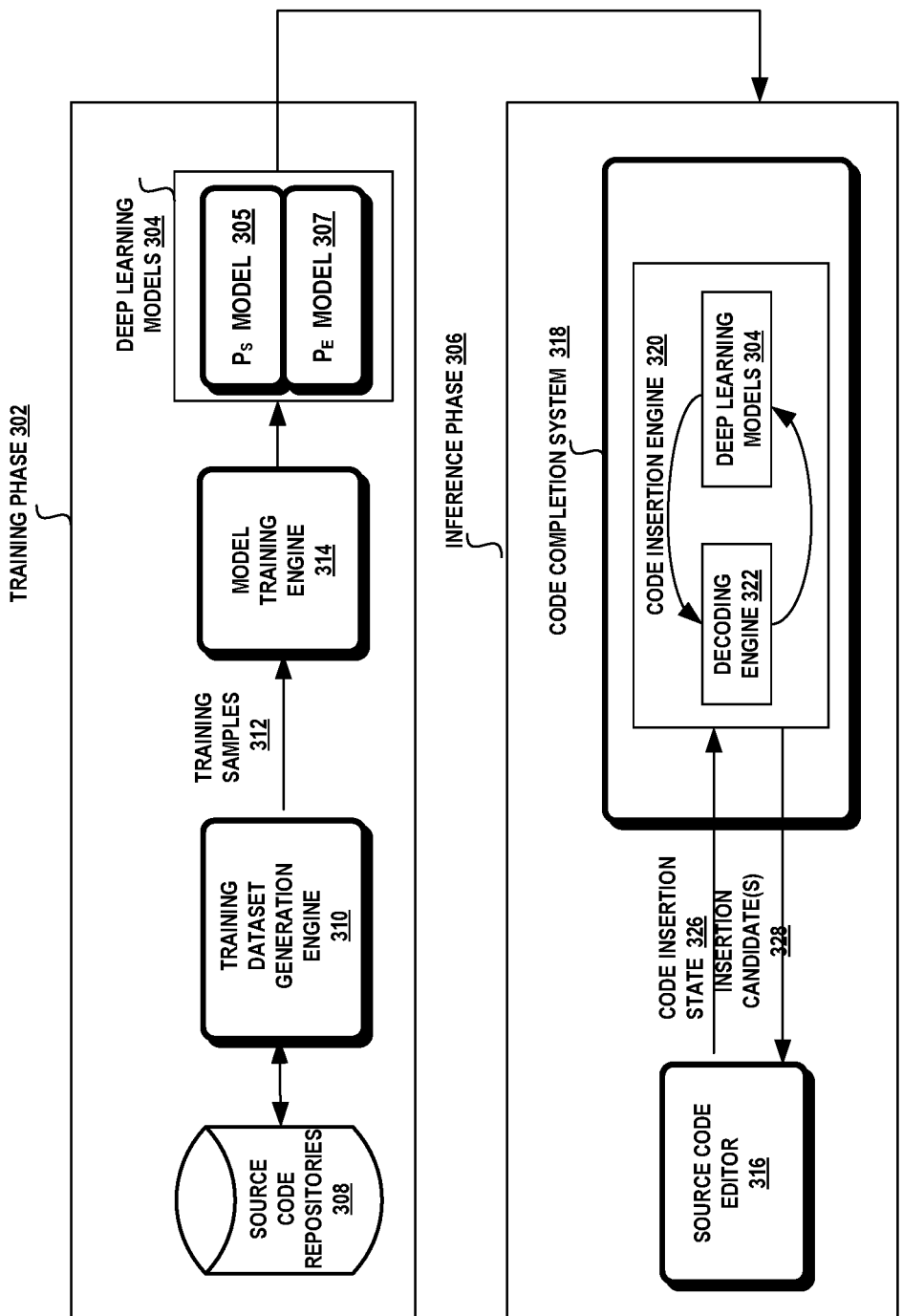
FIG. 3 illustrates an exemplary code completion system having a training phase and an inference phase.

FIG. 3 illustrates a block diagram of an exemplary system 300 in which various aspects of the invention may be practiced. As shown in FIG. 3, system 300 includes a training phase 302 in which components are used to train two deep learning models 304 and an inference phase 306 that utilizes the models 304 in a code completion system 318. The models 304 include a non-terminal selector model 305 and a non-terminal expansion model 307.

The non-terminal selector model Ps (i|x), 305, predicts the position of the non-terminal i to expand in a given sequence x of terminal and non-terminal symbols, where i∈N (x), where N is a set of non-terminals. Conditioned on x, Ps, produces a probability distribution over the non-terminal symbols, N(x).

The non-terminal expansion model Pe (y|x, i), 307, generates the expansion sequence $y=y_1, y_2, \ldots$, of the selected non-terminal i, where y∈ΣUN, and Σ is the set of terminal symbols. Pe is conditioned on x and a position i∈N(x) and generates a probability distribution over expansion sequences u∈(ΣUN)*.

In one aspect, the non-terminal selector model 305 is a multilayer perceptron model (MLP) and the non-terminal expansion model 307 is a neural transformer model with attention. A MLP is a feed-forward neural network having at least three layers of nodes: an input layer; a hidden layer; and an output layer. The nodes of the hidden layer and the output layers contain non-linear activation functions that utilize weights and biases that are learned during training and fine-tuning.

The non-terminal expansion model 307 is trained by a model training engine 314 from a self-supervised training dataset 312 of training samples 312 derived from various source code programs from various source code repositories 308. A source code repository 308 may be a file archive and web hosting facility that stores large amounts of source code either privately or publicly. The source code repository 308 can be structured as a version control system, such as GIT, Mercurial, etc.

The training dataset generation engine 310 extracts source code programs from the various source code repositories 308 to construct a self-supervised training dataset to train the non-terminal expansion model 307. In one aspect, the self-supervised training dataset includes training samples 312 where each sample represents a code insertion state, a position of a non-terminal position to expand, and the true non-terminal expansion. The model training engine 314 applies the samples 312 to the non-terminal expansion model 307 to train the model to learn the production rules of the programming language. A code insertion state includes the embeddings representing the prefix, the embeddings representing the non-terminal symbol to be expanded, and the embeddings representing the suffix.

The model training engine 314 also trains the non-terminal selector model 305 to learn how to select the most likely non-terminal symbol for expansion. The non-terminal selector model 305 is a multilayer perception model or feed-forward neural network configured to predict the non-terminal symbol to expand and is represented mathematically as $P_s(i|x_t)$=softmax $i \in N(x_t)$ $(f(E(x_t)_i))$, where f is a feed-forward network and $E(x_t)_i$ is the encoded representation of the non-terminal position at i.

Once both models are trained and validated, the models are deployed in the inference phase 306 in a code completion system 318. The code completion system 318 receives a code insertion state 326 and predicts the candidate source code statements to insert into the source code program at the insertion point. The code completion system 318, may include a code insertion engine 320 having a decoding engine 322 and the deep learning models 304.

The code insertion engine 320 receives the code insertion state 326 and utilizes the decoding engine 322 to generate the insertion candidates 328 to insert into the source code program. The decoding engine 322 repeatedly selects and expands non-terminal symbols until an insertion candidate is produced that contains only terminal symbols or the <stop> symbol is predicted as a next non-terminal symbol to expand. The insertion candidate is then extended by appending a <statement> non-terminal symbol and the decoding engine 322 is invoked to predict the expansion of the appended <statement> non-terminal symbol. The decoding engine 322 continues until an insertion candidate is predicted having an ordered sequence of terminal symbols that exceed a maximum insertion candidate length T or the insertion candidate contains a sequence of terminal symbols that match the terminal symbols of the suffix.

It should be noted that FIG. 3 shows components of the system in one aspect of an environment in which various aspects of the invention may be practiced. However, the exact configuration of the components shown in FIG. 3 may not be required to practice the various aspects and variations in the configuration shown in FIG. 3 and the type of components may be made without departing from the spirit or scope of the invention.

Figure 4:
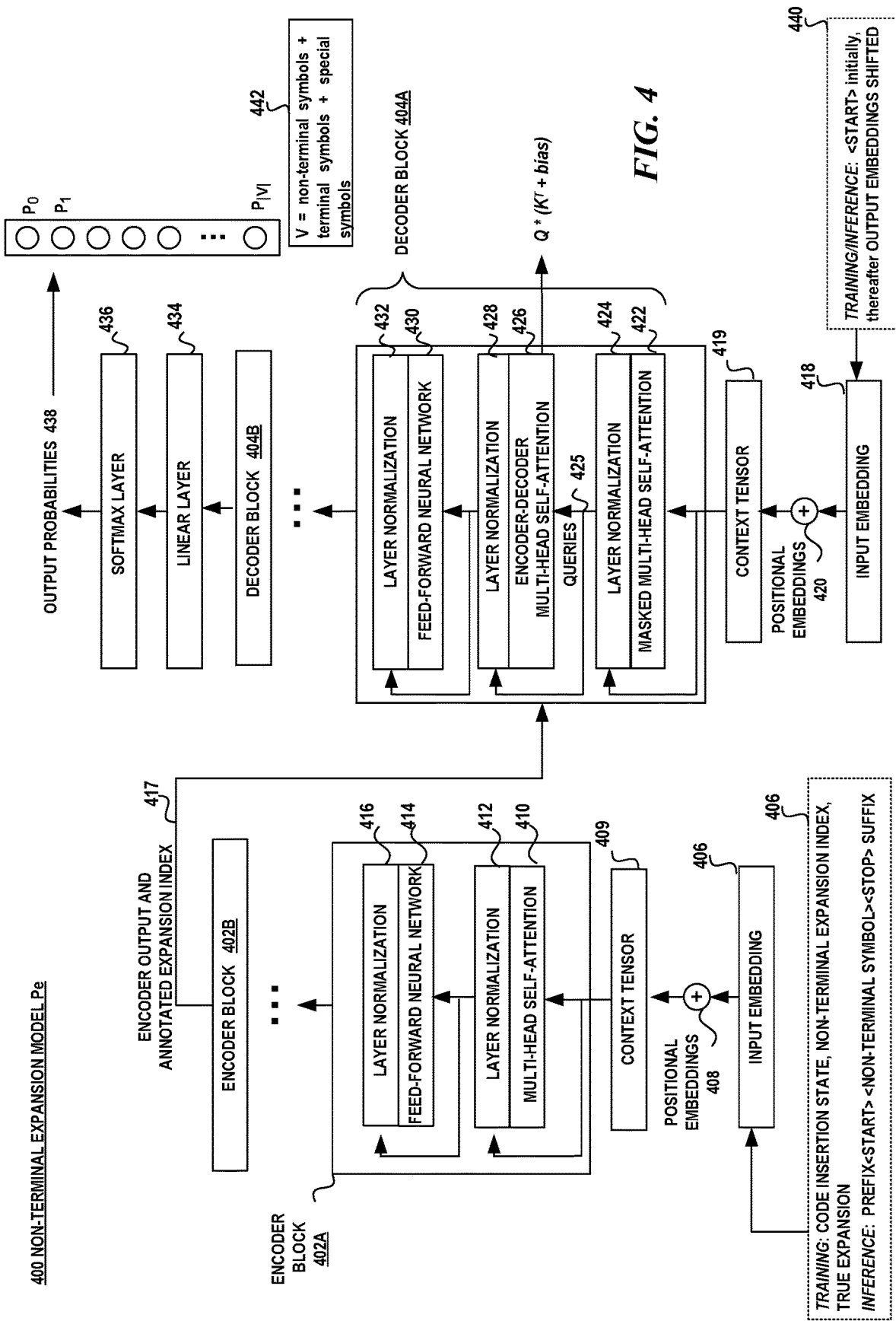
FIG. 4 is a schematic diagram illustrating an exemplary configuration of the non-terminal expansion model.

FIG. 4 illustrates an exemplary configuration of the non-terminal expansion model. In one aspect, the non-terminal expansion model is constructed as a neural transformer model with attention. A neural transformer with attention is a distinct type of machine learning model. Machine learning pertains to the use and development of computer systems that are able to learn and adapt without following explicit instructions, by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. Neural transformers models are one type of deep learning that utilizes an attention mechanism. Attention directs the neural network to focus on a subset of features or tokens in an input sequence thereby learning different representations from the different positions of the tokens in an input sequence. The attention mechanism provides the model with a better capability to learn the task at hand thereby generating more accurate predictions of the candidate method bodies.

In one aspect, the non-terminal expansion model 400 is a neural transformer model having one or more encoder blocks 402A-402B ("402") coupled to one or more decoder blocks 404A-404B ("404"). The initial inputs to an encoder block 402 are the input embeddings 406 of an input sequence of a training dataset. An input sequence consists of a code insertion state, an index of the position of the non-terminal symbol in the code insertion state to expand, and the true expansion of the indicated non-terminal symbol 406.

In order to retain the order of the tokens in the input embedding 406, positional embeddings 408 are added to the input embedding 406 forming a context tensor 409. The initial inputs to the decoder block 404 are a shifted sequence of the output embeddings 418 from a previous time step to which the positional embeddings 420 are added forming context tensor 419.

An encoder block 402 consists of two layers. The first layer includes a multi-head self-attention component 410 followed by layer normalization component 412. The second layer includes a feed-forward neural network 414 followed by a layer normalization component 416. The context tensor 409 is input into the multi-head self-attention component 410 of the first encoder block 402 with a residual connection to the layer normalization component 412. The output of the layer normalization component 412 is input to the feed-forward neural network 414 with another residual connection to layer normalization component 416. The output of the encoder block 402 is a context tensor or set of hidden representations 417. The set of hidden representations 417 is then sent through additional encoder blocks. At the last encoder block, a context tensor 417 is sent to the decoder 404.

Attention is used to decide which parts of the input embedding are important for each token, especially when decoding long sequences since the encoder is limited to encoding a fixed-size vector. Attention mechanisms gather information about the relevant context of a given token and then encode that context into a vector which represents the token. It is used to identify the relationships between tokens in the long sequence while ignoring other tokens that do not have much bearing on a given prediction.

The multi-head self-attention component 410 takes a context tensor 409 and weighs the relevance of each token represented in the context tensor 409 to each other by generating attention weights for each token in the input embedding 406. In one aspect, the attention function is scaled dot-product attention which is described mathematically as follows:

$$\text{Attention}(Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one token in a sequence, K is the vector representations of all tokens in the sequence, and V is the vector representations of all the tokens in the sequence.

The queries, keys and values are linearly projected h times in parallel with $d_v$ output values which are concatenated to a final value:

MultiHead(Q, K, V)=Concat(head$_1$, ..., head$_h$) $W^o$, where head$_i$=Attention($QW_i^Q$, $KW_i^K$, $VW_i^V$), with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and $W^O \in \mathbb{R}^{hd_v \times d_{model}}$.

Layer normalization is used between the layers. The layer normalization components 412, 416 normalize the inputs across the features. The mean and standard deviation is computed across the feature dimensions.

The feed-forward neural network 414 processes each output encoding separately. The output of the top encoder block is a set of attention vectors K and V 417 which is used by the encoder-decoder multi-head self-attention layer 426 of the decoder block 404.

The decoder block 404 predicts a token $t_i$ representing a symbol (i.e., non-terminal symbol/terminal symbol/special symbols (<start>,<stop>)) one-by-one at each time step conditioned on all previously-generated target tokens $t_1$, ... $t_{i-1}$. A decoder block 404 consists of three layers. The first layer includes a masked multi-head self-attention component 422 followed by a layer normalization component 424. The output of the layer normalization component 425 is input into the encoder-decoder multi-head self-attention component 426 with a residual connection to layer normalization component 428. The second layer includes an encoder-decoder multi-head self-attention component 426 followed by a layer normalization component 428. The third layer includes a feed-forward neural network 430 followed by a layer normalization component 432. The output of layer normalization component 428 is input into the feed-forward neural network 430 with a residual connection to layer normalization component 432.

The output of the last decoder block 404B is input into linear layer 434 that projects the vector produced by the stack of decoders into a logits vector. The softmax layer 436 then turns the scores of the logits vector into output probabilities 440 for each symbol in the vocabulary of the model which are positive and normalized. The vocabulary of the model 442 includes the non-terminal symbols, terminal symbols, and special symbols (i.e., <start>,<stop>). These symbols are learned from the training datasets used in the pre-training and fine-tuning phases of the model.

The masked multi-head self-attention component 422 receives the output embeddings of the previous timestep 440. The masked multi-head self-attention component 422 masks the output embeddings from future time steps. The encoder-decoder multi-head self-attention layer 422 receives queries from the previous decoder layer and the memory keys and values 417 from the output of the encoder block 402. In this manner, the decoder block 404 can attend to every position of the input sequence. The feed-forward neural network 430 processes each output encoding separately. A layer normalization component 424, 428, 432 is used between the layers in order to normalizes the inputs across the features.

In one aspect, the neural transformer model with attention contains a stack of six encoder blocks and a stack of six decoder blocks which are aggregated into a neural transformer block. The output of each encoder block is passed onto the next encoder block and processed. Each decoder block receives the attention weights computed from the last encoder block. The use of multiple stacked encoder blocks and decoder blocks increases the model's capacity allowing the model to learn increasing levels of abstraction.

It should be noted that the terms neural transformer model and neural transformer model with attention are used interchangeably.

Methods

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 5:
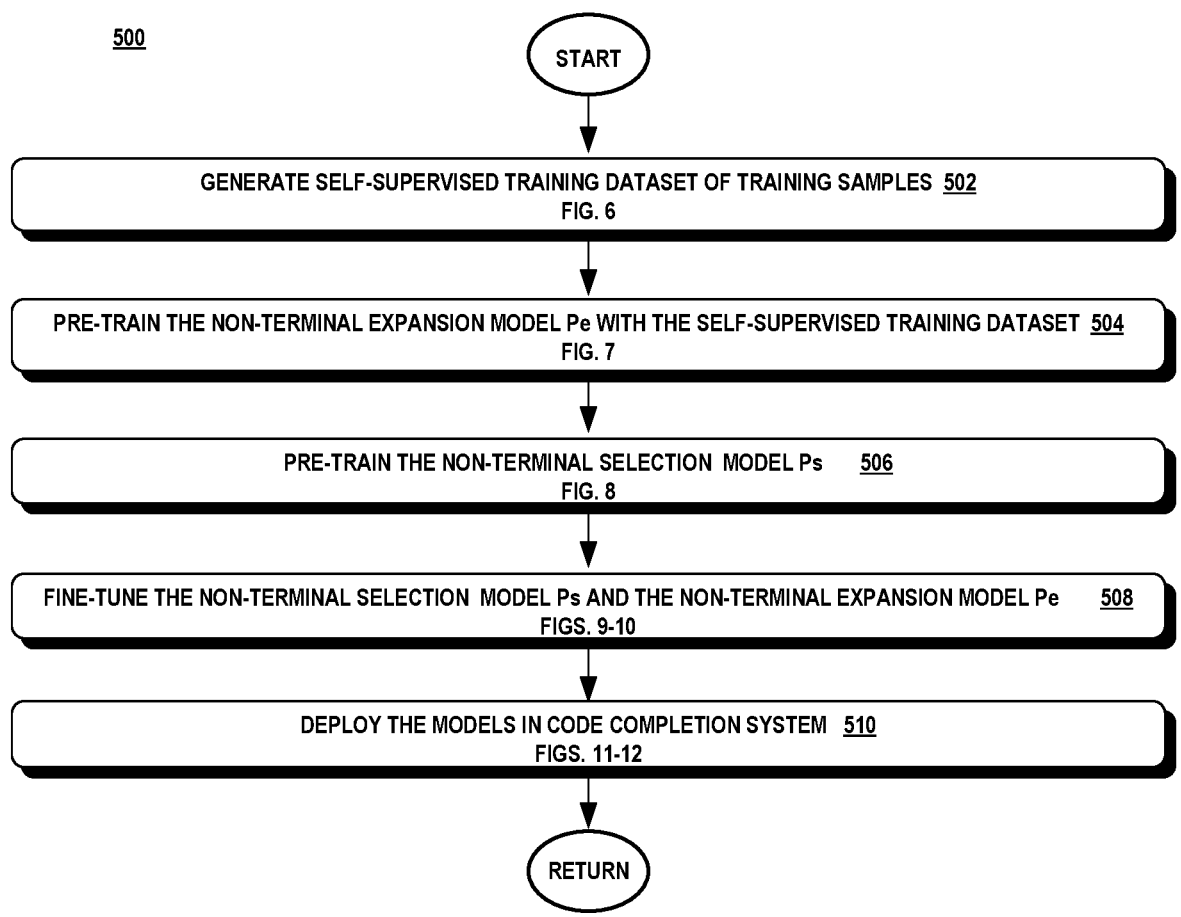
FIG. 5 is a schematic diagram illustrating the exemplary components used to pre-train the non-terminal selector model.

FIG. 5 is an exemplary method 500 of the code insertion system. A self-supervised training dataset of training samples is generated from source code programs extracted from various source code repositories (block 502). The training dataset is then used to pre-train the non-terminal expansion model (block 504). The non-terminal selector model is then pre-trained (block 506). Both models are then fine-tuned (block 508) and upon completion of the training and validation, the models are deployed in a code completion system (block 510).

Generate Training Dataset for the Non-Terminal Expansion Model

Figure 6:
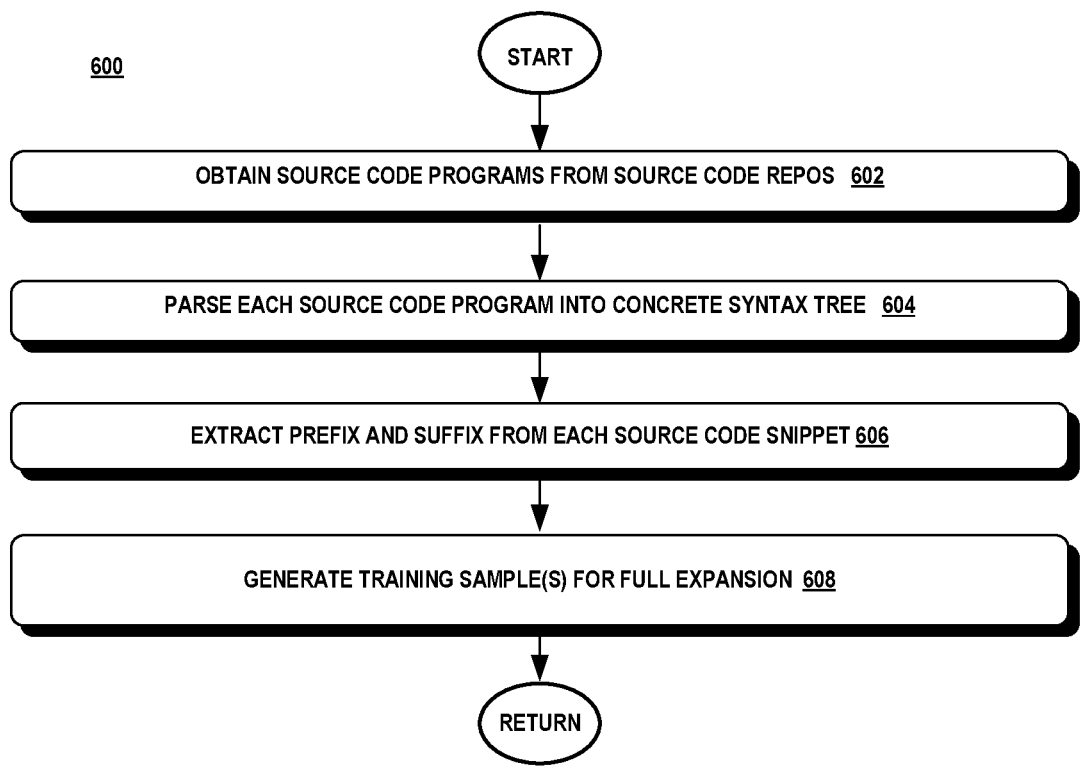
FIG. 6 is a schematic diagram illustrating the exemplary components used to fine-tune the non-terminal selector model and the non-terminal expansion model.

FIG. 6 is a flowchart illustrating an exemplary method for generating the training dataset for the non-terminal expansion model. The training dataset generation engine obtains source code programs from various source code repositories (block 602). In one aspect, the source code programs are written in the same programming language.

The training dataset generation engine 310 transforms each of the selected source code programs into a concrete syntax tree. A concrete syntax tree represents the syntactic structure of a program in a hierarchical or tree structure. The concrete syntax tree is an n-ary tree data structure that includes nodes that represent a construct in the grammar of the programming language of a program. The concrete syntax tree includes one root node, multiple internal nodes, and multiple terminal nodes. The terminal nodes represent the terminal symbols or tokens. The terminal symbol represents an operand or an operator. The non-terminal nodes represent elements of the grammar on the left-side of a production rule. (Collectively, block 604).

The training dataset generation engine 310 identifies a portion of the concrete syntax tree or subtree that represents one or more statements or a statement block within a method that will be predicted by the models. For example, the training dataset generation engine may look for a subtree having an initial node with the <statement> or <expression_statement> non-terminal symbol or a sequence of continuous statements of type <statement> or <expression_statement>. The terminal symbols representing the source code immediately preceding the subtree are extracted as the prefix and terminal symbols representing the source code immediately following the subtree are extracted as the prefix. (Collectively, block 606).

A training sample is generated containing the prefix, a single starting non-terminal symbol or a sequence of contiguous non-terminal symbols in the grammar of the programming language that represents the statements that are to be predicted, and the suffix. The single non-terminal symbol is preceded by a start symbol, <start>, and succeeded by a stop symbol, <stop>. The training sample consists of the tokens representing the terminal symbols in the prefix, the tokens representing the non-terminal symbol, and the tokens representing the terminal symbols in the suffix. (Collectively, block 608).

The full expansion of a non-terminal symbol may consist of multiple training samples. For example, the full expansion of the <statement> non-terminal symbol shown in FIG. 2 consists of 22 expansions where each expansion is a training sample along with its respective prefix and suffix. (Collectively, block 608).

Train Non-Terminal Expansion Model

Figure 7:
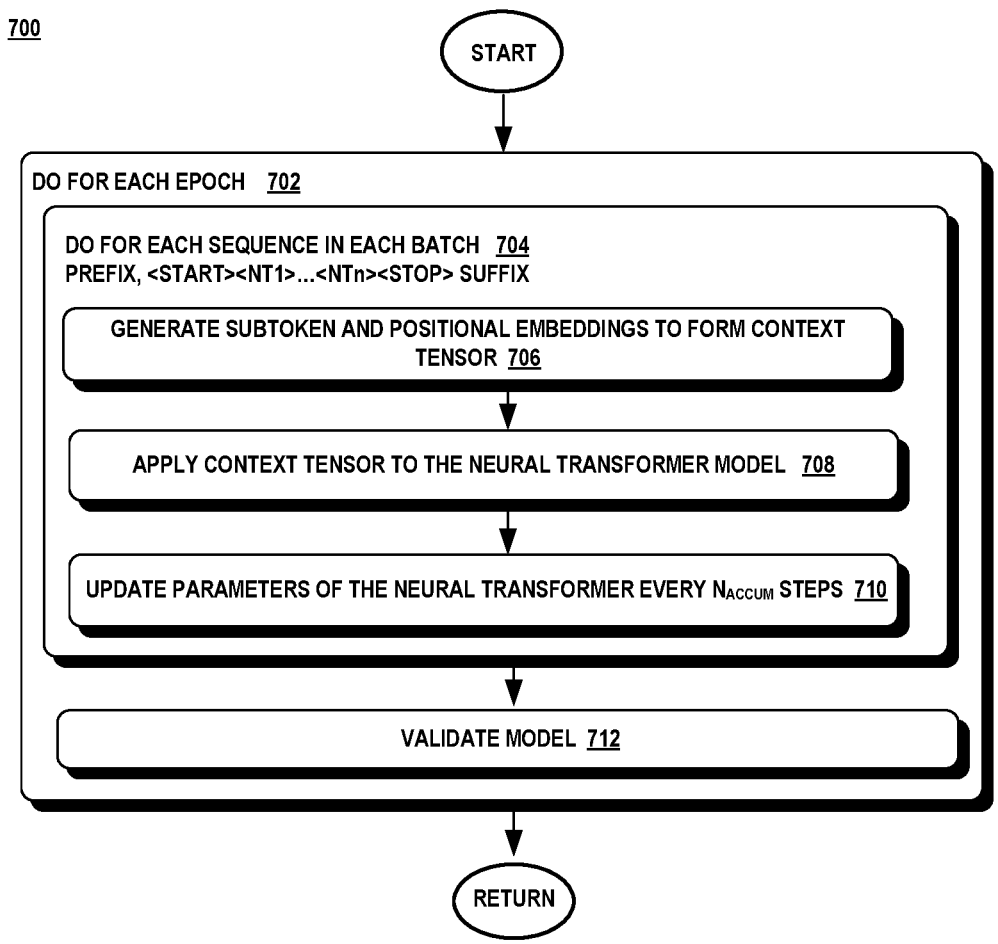
FIG. 7 is a flow diagram illustrating an exemplary method of the code completion system.

FIG. 7 shows an exemplary method 700 for pre-training the non-terminal expansion model. The training dataset is partitioned into batches with each batch of training samples running through the training process. The samples are initially transformed into numeric vectors and then embeddings. An embedding is a mapping of discrete categorial variables to a vector of continuous numbers. There is a token/subtoken embedding and a positional embedding for each training sample. The token/subtoken embeddings represent the tokens and/or subtokens in a training sample and the positional embeddings represents the order of a token/subtoken in a training sample.

Each token/subtoken embedding and its corresponding positional embedding are combined to form a context tensor. A tensor is a mathematical object that has indices and components that follow certain transformation rules. It is a generalization of vectors and matrices and represented as an n-dimensional array. The tensor in this instance represents a context of a source code program. The size of the context tensor is T x size of the embedding vector (e.g., embedding size), where T is the length of the token/subtoken sequence.

For each sequence of each batch in each epoch (blocks 702, 704), the T-ordered sequences of subtokens are then mapped into numeric vectors and then into respective subtoken embeddings and positional embeddings (block 706). An embedding is a learned representation for the text-based subtokens where subtokens that have a common meaning have a similar representation. An embedding is a mapping of discrete categorical variables to a vector of continuous numbers. There is an embedding for each subtoken in the vocabulary and a corresponding positional embedding. The subtoken embedding represents the learned representation for the subtoken. The neural transformer model does not read each subtoken sequentially and as such, has no knowledge of the subtoken's position in a sequence without additional position information. The positional embedding is used to embed position information about a subtoken's position in a sequence into the neural transformer model.

Initial values are generated for the subtoken embedding and positional embeddings of each sequence which are then used to form a context tensor. Thereafter, the neural transformer model learns the values for each embedding. Upon the completion of the training phase, the embeddings for each subtoken and the positional embeddings are saved into respective matrices for later use. There is a subtoken embedding matrix, We, that contains an embedding vector for each subtoken $t_i$, i=0 . . . V, and a positional embedding matrix, Wp, that contains an embedding vector $P_j$, j=0 . . . T, for each position, where V is the size of the vocabulary and T is the length of the subtoken sequence. (Collectively, block 708).

The first encoder block of the neural transformer model takes the context tensor as input and passes it through the multiple layers of multi-head self-attention layer normalization and feed-forward neural network to finally produce a set of hidden representations If there are additional encoder blocks, the output of each encoder block is passed onto the next encoder block with the output of the last encoder block producing the context tensor of a set of hidden representations. The set of hidden representations is passed onto each decoder block. (Collectively, block 708).

The decoder blocks of the neural transformer models take a shifted sequence of an output embedding as input. The masking in the masked multi-head self-attention layer is used to prevent positions from attending to subsequent positions in the future. The masking combined with the output embeddings shifted by one position ensures that the predictions to position T depend only on the known outputs at positions less than T. Starting with the first token of the output sequence, the subtokens are passed through the self-attention and normalization layers and into the encoder-decoder attention layer, serving as the query for encoder-decoder attention, where the key and value pairs for the attention are the outputs of encoder. The encoder output was calculated with the entire input embedding sequence. (Collectively, block 708).

The feed forward neural networks in the encoder blocks and the decoder blocks are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, the following loss function is used to pre-train the encoder and decoder of the non-terminal expansion model by minimizing the negative log-likelihood of the correct expansion for all non-terminals in x as follows:

$$\mathcal{L}(x_t, \{y_{t \ominus i^*}\}_{i \in \tilde{N}(xt)}) = \frac{1}{|\tilde{N}(x_t)|} \sum_{i \in \tilde{N}(x_t)} -\log Pe\ (y_{t \ominus i}|x_t, i),$$

where $y_{t \ominus i^*}$ is the ground-truth expansion for every non-terminal position $i \in \tilde{N}(x_t)$.

Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation algorithm may be used to update the weights. (Collectively, block 708).

At the completion of each batch, the parameters of the neural transformer model are updated at a preconfigured frequency denoted as Naccum. Naccum is the gradient accumulation frequency and in one aspect has a value of 4. The parameters include the subtoken embeddings and the positional embeddings which are stored in a respective embedding matrix. (Collectively, block 710).

Next, the neural transformer model is validated. Before the neural transformer model is trained, a set of hyperparameters is selected randomly and then tuned to achieve a desired performance. The neural transformer model is tested using a validation dataset to determine the appropriate hyperparameters settings to achieve a desired goal. When the desired goal is not achieved, one or more hyperparameters are adjusted and the training is repeated until the target goal is achieved. (Collectively, block 712).

Attention now turns to a description of the pre-training of the non-terminal selector model.

Pre-Train the Non-Terminal Selector Model

The non-terminal selector model is trained through reinforcement learning. Reinforcement learning is a technique that uses a system of rewards and penalties to compel the non-terminal selector model to learn to solve a problem by itself. The non-terminal selector model learns to predict the position of the most likely non-terminal symbol of an input sequence to expand by maximizing a reward. The model learns through interactions between an active decision-making agent and its environment (e.g., training dataset).

Reinforcement learning differs from supervised learning and unsupervised learning. In supervised learning, a model learns from a training dataset of labeled examples. Each sample in the training dataset contains a correct action that the model should take. The model learns to generalize its actions in order to act in situations not present in the training dataset. In unsupervised learning, the model learns to find patterns or structure hidden in the training dataset of unlabeled data. By contrast, reinforcement learning maximizes a reward gradually observed on its outputs during its training instead of trying to find hidden patterns and structure in the unlabeled training dataset.

In reinforcement learning an actor interacts over time with its environment to achieve a goal and learns the actions that produce the most reward by trying them. The actor (e.g., neural network) observes the current state of the environment (e.g., tuples) to decide which action to take (e.g., prediction of next token in a code sketch). The environment changes state and produces a reward for that action. The reward indicates whether the action was good or bad. A penalty is imposed when the action is bad. The cycle of observation, action, and reward is repeated until the learning is complete.

The actor uses a function or policy that maps the inputs into the actions or outputs. The environment uses the reward as feedback on the action. The goal of the training phase is for the Ps model to learn the optimal policy. The non-terminal selector model comprises a neural network which learns the optimal policy that maps a large set of observations into a set of actions that control the environment. The neural network includes an activation function, a number of hidden layers, and a number of neurons in each layer. The learning algorithm generates the weights and biases for the nodes in the neural network that produce the optimal action.

In one aspect, the neural network is trained using a policy-based learning method. The policy-based learning method differs from traditional training methods that optimize a maximum-likelihood loss or cost function (e.g., cross entropy loss). Instead, the policy-based learning method maximizes a specific, potentially discrete, non-differentiable metric instead of optimizing a maximum-likelihood loss function.

In one aspect, self-critical policy gradient training is used to train the neural network to minimize the following function using a reward function $r$ ($\hat{x}$, $x^*$) measuring the quality of a sketch $\hat{x}$ given a ground truth sequence of terminals $x^*$ as follows:

$$\mathcal{L}_{train}(x_0, x^*) = (r(x_{out}, x^*) - \bar{r}(x_0)) \Sigma_{t=0}^{T}(-\log Ps(i_t|x_t) - \mathbb{1}_{(i_t \neq \emptyset)} \log Pe(y_{t,i}|x_t, i_t)), \quad (1)$$

where t is the index of an input training sequence, $\mathbb{1}$ (•) is the indicator function, $x_0$ is the input sequence, $x^*$ is the ground truth sequence of terminals, and $\bar{r}$ ($x_0$) is the reward achieved by the prediction from the snapshots of Ps and Pe that achieved the best score so far. Minimizing $\mathcal{L}_{train}$ is equivalent to maximizing the conditional likelihood of the sampled sequence $x_0$ if it obtains a higher reward than $x^*$ thereby increasing the reward expectation of the model.

The reward function is computed by an evaluation metric that compares the generated sequence $x_{out}$ to the corresponding ground truth sequence, $x^*$. In one aspect, the evaluation metric is an average of REGEXACC and ROUGE as follows:

$$r(\hat{s}, s^*) = \frac{1}{2}(REGEXACC(\hat{s}, s^*) + \text{ROUGE}(ERASEHOLES(\hat{s}, s^*))), \quad (2)$$

where $\hat{s}$ is an output sketch, $s^*$ is a ground truth sequence that does not contain any non-terminals, where $$REGEXACC(\hat{s}, s^*) \triangleq \frac{nTerm(\hat{s})}{nTerm(s*)} * \text{matches}(toRegex(\hat{s}), s^*),$$

and where $toRegex(\hat{s})$ turns a predicted sketch $\hat{s}$ into a regular expression by replacing all holes with the wildcard matching any non-empty sequence ("•+" in Perl Compatible Regular Expression syntax), where REGEXACC returns a score of 1 if the REGEXACC matches the ground truth, (i.e., matches (•, •)), otherwise it returns 0, and where nTerm(a) is a function that returns the number of terminal symbols in a.

Recall-Oriented Understudy for Gisting Evaluation (ROUGE) is a set of metrics that is used herein to evaluate the quality of the predicted sketch compared to the ground truth code snippet. ROUGE counts the number of overlapping tokens sequences between the generated sketch $\hat{s}$ and the ground-truth code $s^*$.

In other aspects, the reward function may be based on a Bilingual Evaluation Understudy (BLEU) score, a negative Levenstein distance, or combination thereof.

Figure 8:
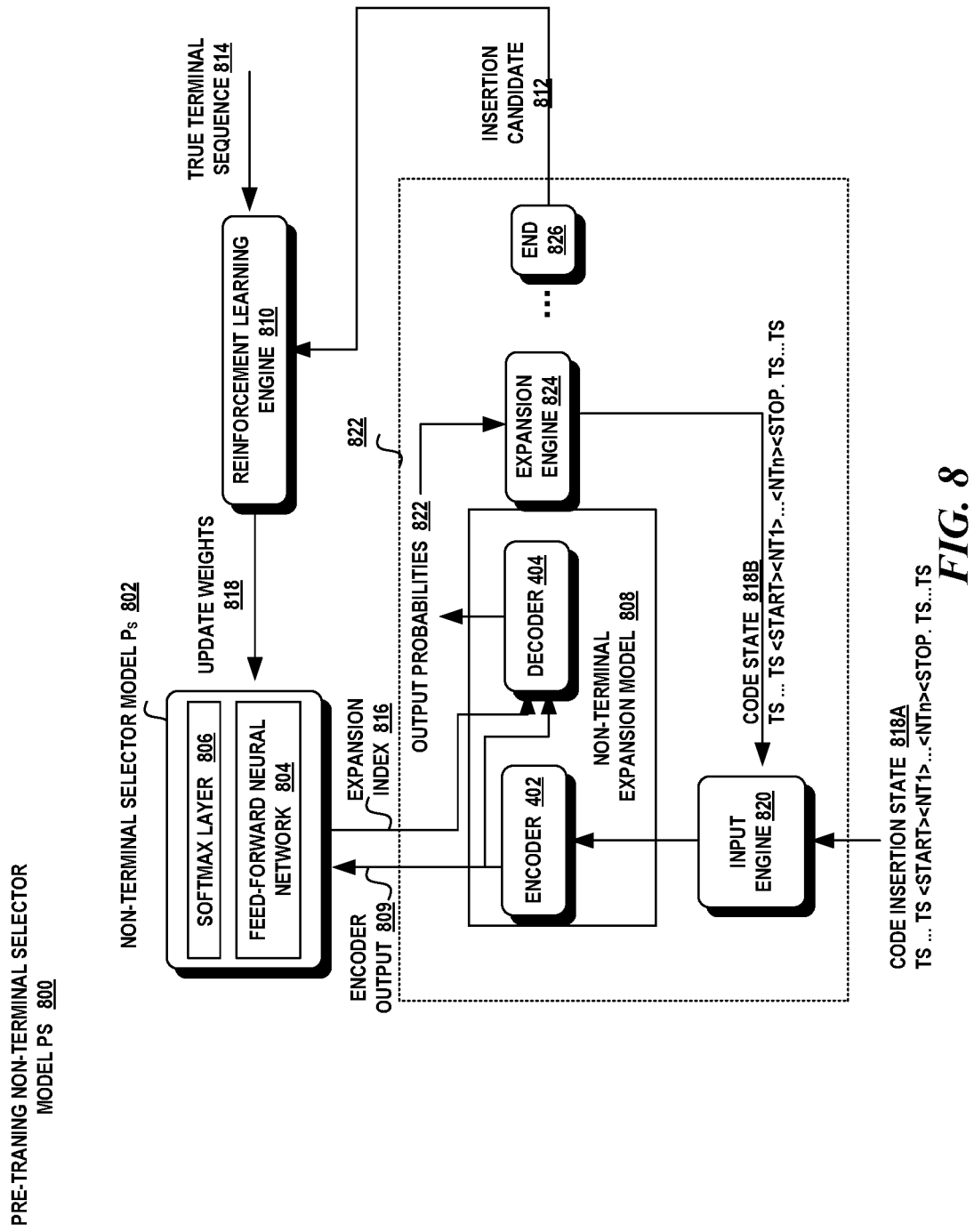
FIG. 8 is a flow diagram illustrating an exemplary method for generating the training dataset to train the non-terminal expansion model.

Turning to FIG. 8, there is shown an exemplary configuration for pre-training the non-terminal selector model through reinforcement learning 800. The non-terminal selector model 802 includes a feed-forward neural network 804 and a softmax layer 806. The pre-trained non-terminal expansion model Pe 808 includes the encoder blocks 402 and decoder blocks 404 described above. The input sequence received by the encoder includes a code insertion state 818A. The output of the encoder of the pre-trained non-terminal expansion 809 is received by the non-terminal selector model 802 which generates an expansion index 816 that is used by the encoder-decoder multi-head self-attention layer of the decoder 404.

The non-terminal expansion model 808 is utilized to predict a candidate 812 using the iterative process shown in block 822. An initial code insertion state 818A is received by the encoder 502 which outputs an encoding 809 that is input to the non-terminal selector model 802. The non-terminal selector model predicts an expansion index and the non-terminal expansion model 808 predicts the expansions by generating the output probabilities 822. The expansion engine 824 generates an expansion which is denoted as a code state 818B which is then received by the input engine 820. The process repeats until the expansion engine 824 reaches an end state 826 which is when there are no more non-terminals to expand resulting in insertion candidate 812.

A reinforcement learning engine 810 computes the reward using equation (1) above by measuring the quality of the predicted code sketch 812, output by the decoder, given its true terminal sequence 814. The true terminal sequence is the sequence of terminals that the partial-code state should be expanded to. If the value of the reward is positive, then the weights of the non-terminal selector model are updated through backpropagation to further increase the probability of selecting the given non-terminal index. If the value of the reward is negative, the weights of the non-terminal selector model is updated to decrease the probability of the given non-terminal index.

Attention now turns to a further description of the method for fine-training the non-terminal selector model and the non-terminal expansion model.

Fine-Tuning

Once the non-terminal selector model and the non-terminal expansion model are pre-trained, both models are fine-tuned with all model parameters (e.g., weights and biases) updated when the reward of equation (1) above indicates that the predicted insertion candidate is of a poor quality.

Figure 9:
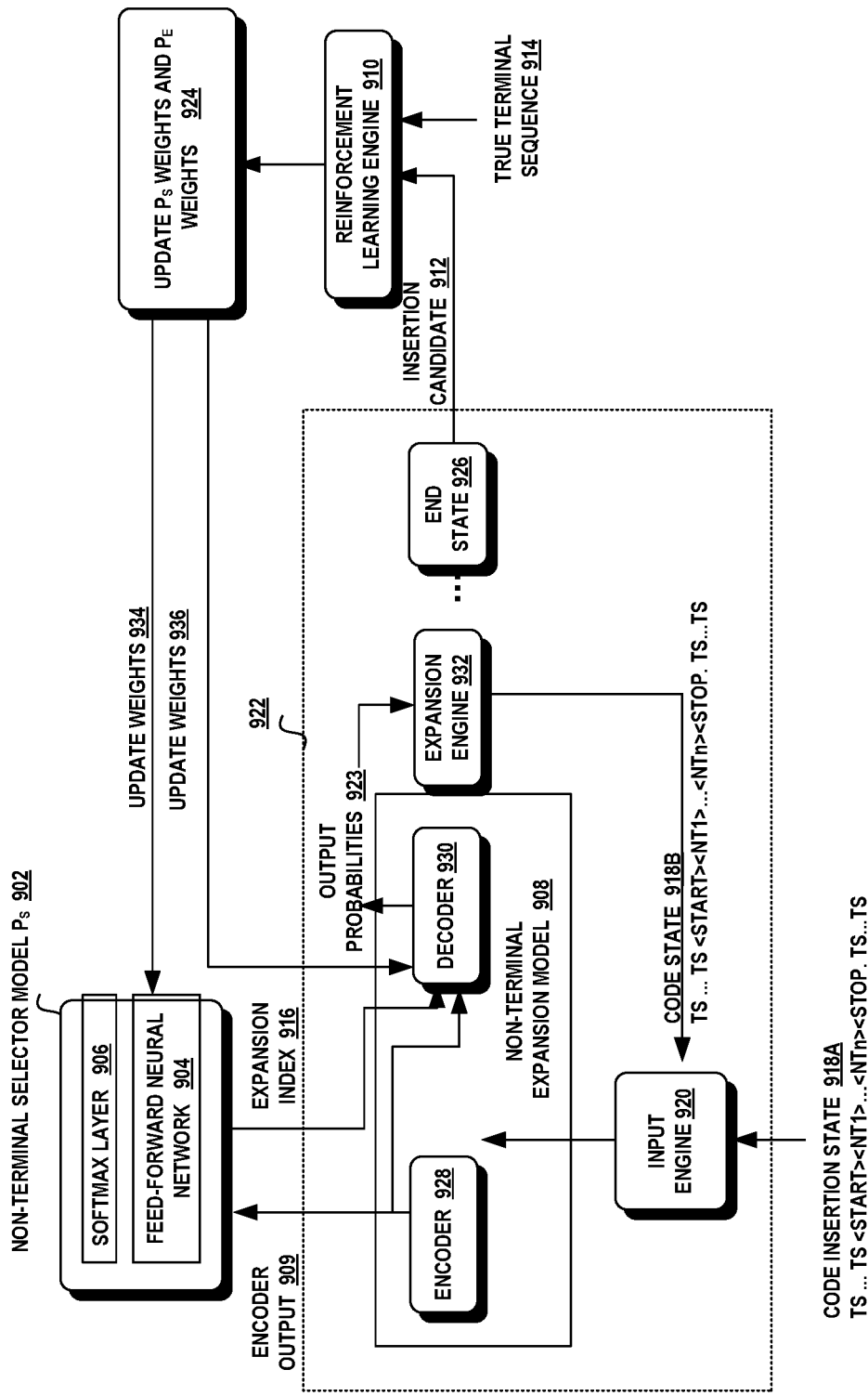
FIG. 9 is a flow diagram illustrating an exemplary method for training the non-terminal expansion model.

Turning to FIG. 9, there is shown an exemplary configuration of the coupled non-terminal selector model and the non-terminal expansion model for fine-tuning 900. The fine-tuning dataset consists of code insertion states. The pre-trained non-terminal expansion model 904 includes encoder blocks 906 and decoder blocks 908. The encoder of pre-trained non-terminal expansion model 904 receives embedded sequences of the fine-tuning dataset and generates an encoder output 910 that is received by the non-terminal selector 912. The non-terminal selector model 912 includes a feed-forward neural network 914 and a softmax function 916 which predicts the index of the non-terminal symbol that should be expanded. This expansion index 918 is sent to the decoder.

The non-terminal expansion model is utilized to predict an insertion candidate 912 using the iterative process shown in block 923. An initial code insertion state 918A is received by the encoder 928 which outputs an encoding 909 that is input to the non-terminal selector model 902. The non-terminal selector model 902 predicts an expansion index and the non-terminal expansion model 908 predicts the expansions by generating the output probabilities 922. The expansion engine 932 generates an expansion which is denoted as code state 918B which is then received by the input engine 920. An expansion is the application of a production rule to a non-terminal symbol. The process repeats until the expansion engine 932 reaches an end state 926 which is when there are no more non-terminals to expand resulting in insertion candidate 912. The insertion candidate 912 includes the predicted statements.

The insertion candidate 912 is analyzed with the true terminal sequence 914 by the reinforcement learning engine 910. The reinforcement learning engine 910 computes the reward using the predicted insertion candidate 912 and the true terminal sequence 914. Using the reward, it computes the loss of equation (1) above and updates the weights of the non-terminal expansion model 936 (e.g., attention weights and biases, weights and biases of each neural network layer including the normalization layers) towards minimizing the loss. The weights of the non-terminal selector model 902 are also updated 934 (e.g., weights of 904) towards minimizing the loss function of equation (1).

Figure 10:
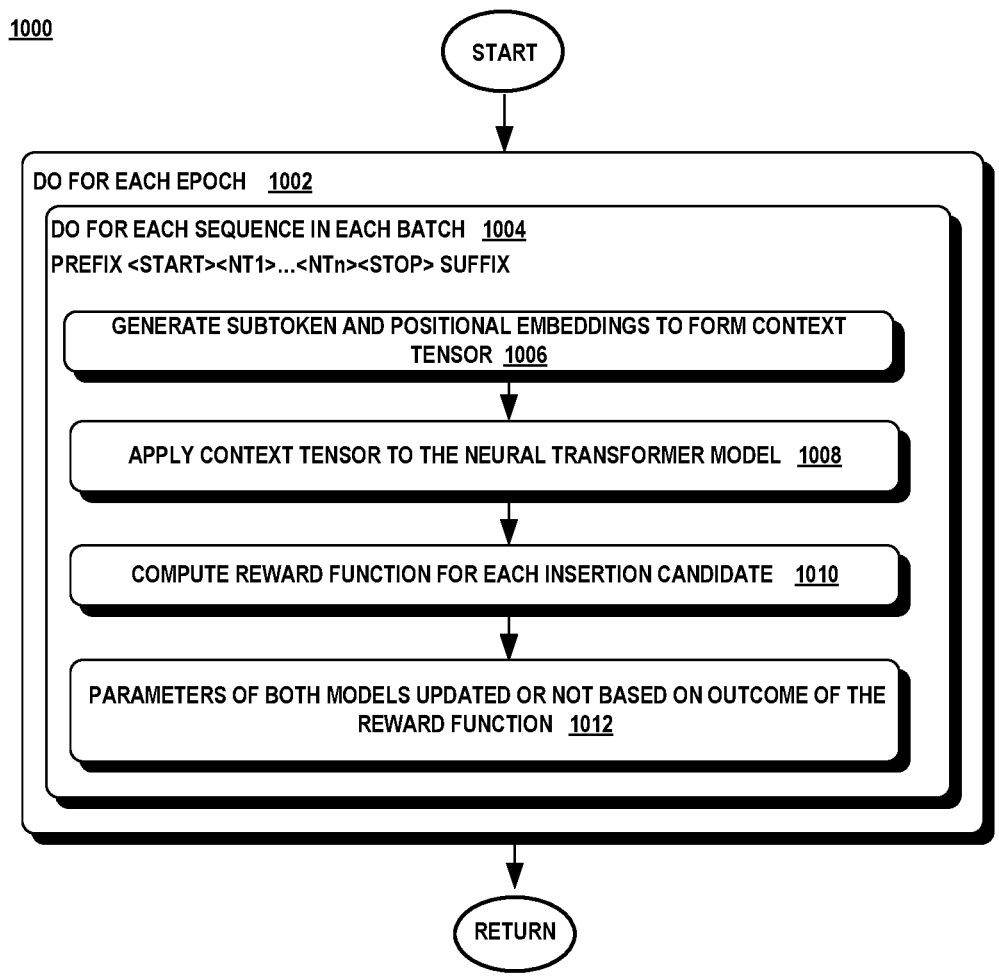
FIG. 10 is a flow diagram illustrating an exemplary method for training the non-terminal selector model.

Turning to FIG. 10, for each training sequence of each batch in each epoch (blocks 1002, 1004), the T-ordered sequences of subtokens are then mapped into numeric vectors and then into respective subtoken embeddings and positional embeddings input into a context tensor (block 1006). The context tensor is applied to the coupled models as described above with respect to FIG. 9 (block 1008). The reward is computed for the predicted insertion candidate (block 1010). When the reward indicates that the insertion candidate is poor, the parameters of the non-terminal selector model are updated in addition to the weights of the non-terminal expansion model (block 1012). If the reward indicates that the insertion candidate is satisfactory, the weights and parameters are not updated (block 1012).

Attention now turns to a discussion of the inference phase.

Inference Phase

The inference phase uses a decoding engine that utilizes a two-step beam search to generate insertion candidates having one or more source code statements for a given code insertion state. A beam search uses a breadth-first search to build a search tree. At each level of the search tree, the k best code states are expanded to the next level, where k is the beam width. Each of the k best code states is expanded to successor states by expanding a non-terminal symbol until the stop symbol is predicted as the next best non-terminal symbol to expand.

In the first beam search step, the top-M non-terminal positions to expand for a given token sequence $x_t$ is predicted by the non-terminal selector model $P_s$. For each of these M positions, the non-terminal expansion model $P_e$ predicts in a second beam search step, the top-N expansions. For all the k*N*M combinations, the likelihood of each combination is computed and the top-k predictions are kept and output to the user.

A beam search is used to generate consecutive predictions that depend on each other such as where a non-terminal expansion at time t-1 affects the prediction at time t. An easy solution would be to pick the best expansion at each time given what has been expanded to far and to pick the next best expansion. This greedy approach results in a "local optima" problem where the solution is optimal for a neighboring set of solutions but fails for finding the optimal solution among all possible solutions. Instead, the beam search keeps a list of the M most promising candidates and expands each of them, yielding M×N candidate expansions. Then, the top-M candidates are kept. This alleviates the "local optima" problem.

Figure 11:
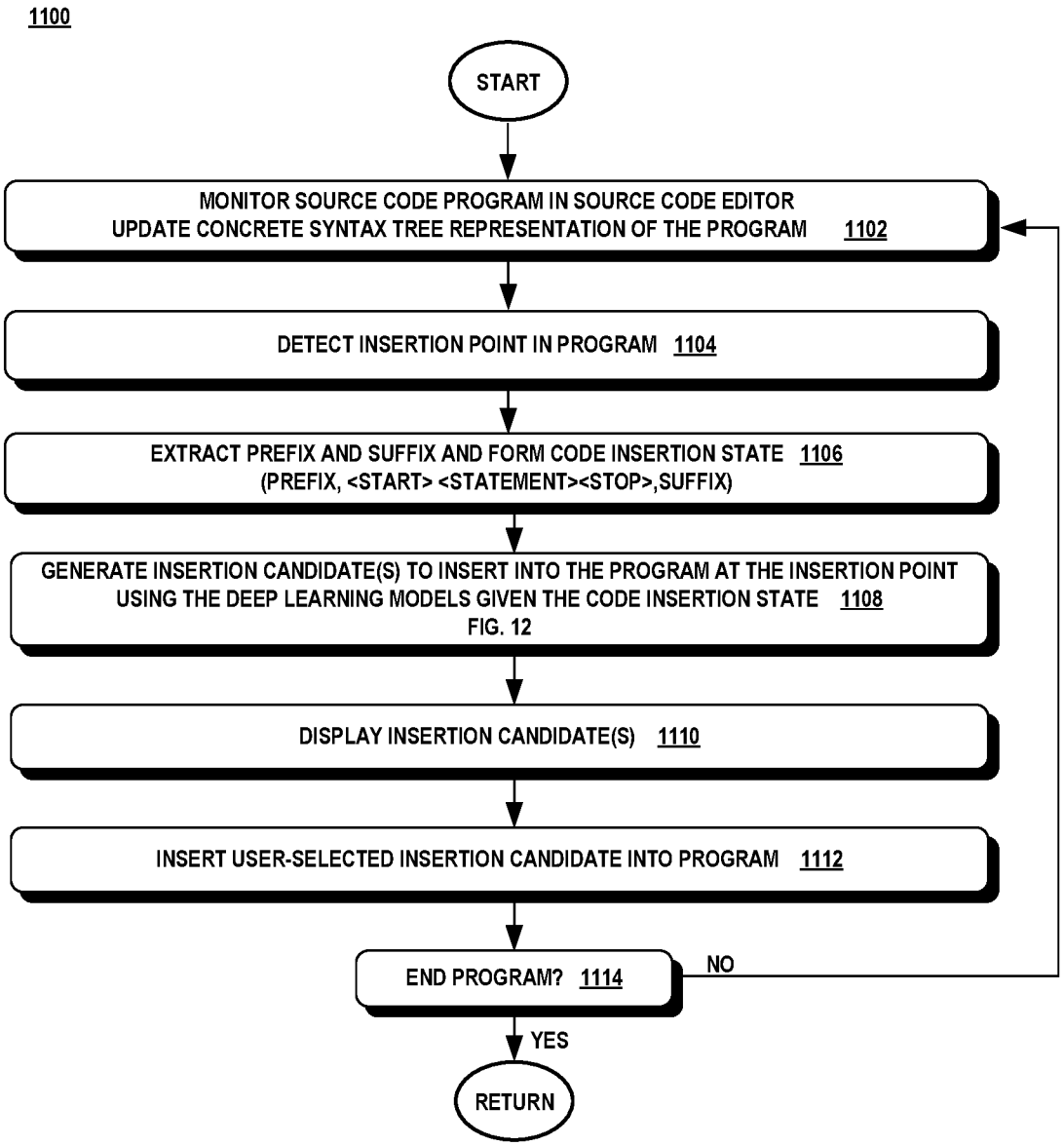
FIG. 11 is a flow diagram illustrating an exemplary method for predicting source code statements given a code insertion state.

FIG. 11 is an exemplary method of the inference phase 1100. A code insertion state is obtained for which an insertion candidate is generated. In one aspect, the code insertion state represents the surrounding context of an insertion point in a source code program and a single non-terminal symbol to expand. The source code program is being edited in a source code editor or integrated development environment.

The source code program is monitored in the source code editor in a background process. The background process creates and updates a concrete syntax tree of the source code of the program in the source code editor. As the developer edits the source code, the concrete syntax tree is updated to reflect any changes. (Collectively, block 1102).

At some point in the edit session, the editor detects that the developer intends to insert additional source code statements into the program. In one aspect, the developer issues a particular set of keystrokes (e.g., CTL+V, F12) at a specific location in the program to denote an insertion point. Alternatively, the insertion point can be determined by a greedy search. The greedy search would place a single non-terminal symbol, such as <statement> after each line of code in the program and determine the highest probability prediction by the models to continue expanding around that location. (Collectively, block 1104).

Upon the detection of an insertion point, the source code editor extracts the prefix and the suffix surrounding the insertion point from the concrete syntax tree and forms the code insertion state. The code insertion state includes the prefix, single non-terminal symbol <start><statement><stop>, and suffix. (Collectively, block 1106).

The code completion system invokes the code insertion engine to generate an insertion candidate to insert into the program at the insertion point using the deep learning models given the code insertion state. The insertion candidate may include one or more source code statements. (Collectively, block 1108).

One or more insertion candidates may be displayed in the source code program (block 1110). The developer may select an insertion candidate which is input into the source code program (block 1112). The process continues (block 1114-no, block 1102) until the program ends (block 1114-yes).

Figure 12:
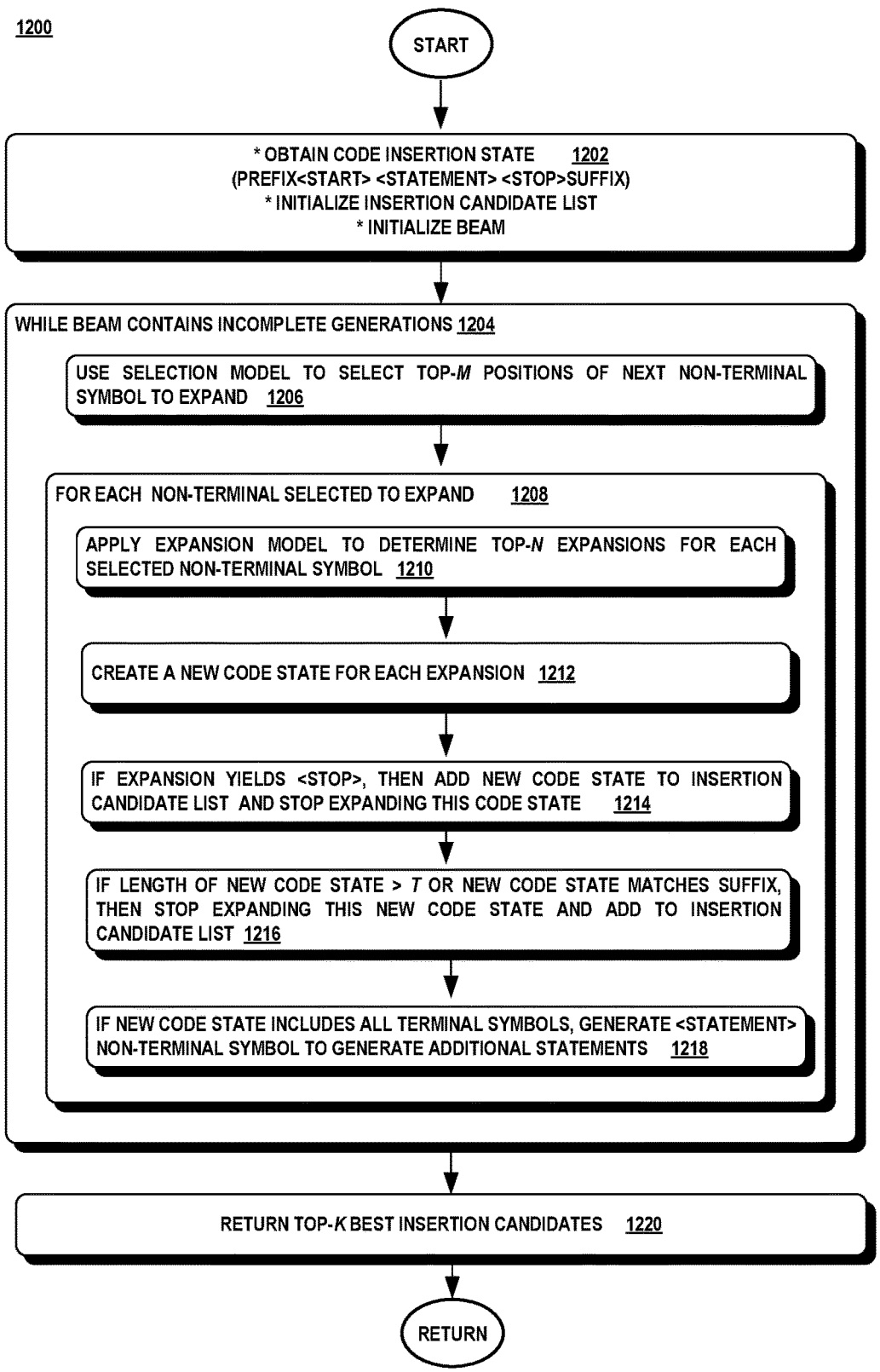
FIG. 12 is a flow diagram illustrating an exemplary method for generating insertion candidates to insert in between two existing source code segments using the deep learning models.

Turning to FIG. 12, there is shown an exemplary method 1200 of the decoding engine for generating or predicting an insertion candidate of source code statements to insert into an insertion point. The decoding engine of the code insertion engine receives an input sequence containing embeddings representing the prefix, embeddings representing the single non-terminal symbol, and the embedding representing the suffix. The non-terminal index J is set to the position of the non-terminal symbol in the input sequence and the insertion candidate list is initialized as empty (Collectively, block 1202).

A beam is a tuple that represents a code state, x, its log probability p, and a flag isDone. The log probability p represents the accumulated log probabilities, p, ps, and pe, generated for each code state during the first-step beam search and the second-step beam search, where ps is the log probability computed from the non-terminal selector model and pe is the log probability computed by the non-terminal expansion model. The flag isDone is set to true when there are more expansions needed and when set to false indicates that the expansion of the beam is finished. A beam is initialized for the initial code PS state which includes the code insertion state, $x_0$, with a log probability of 0, and isDone set to true. (Collectively, blocks 1202).

The method iterates while the beam contains an incomplete generation (blocks 1206-1220). An incomplete generation exists when a state of the beam has isDone set to false (block 1204).

The non-terminal selector model predicts the top-M non-terminal symbols having the highest probability to expand and their corresponding position i in the code state x. The non-terminal selector model Ps is given the code state x and the model returns an output probability for each non-terminal symbol in the set of non-terminal symbols, N(x). The output probability indicates the likelihood of a non-terminal symbol in the code state to be expanded next given the sequence of symbols in code state x, which includes the prefix and suffix. The M non-terminal symbols having the highest probability are selected and their corresponding position i in the code state x. (Collectively, block 1206).

The inner loop (blocks 1208-1218) iterates for each new code state (x, p, isDone) in the beam that is generated through an expansion. Each of the top-M non-terminal symbols selected by the non-terminal selector model is expanded using the top-N expansions predicted by the non-terminal expansion model (block 1210). The non-terminal expansion model generates an output probability for each production rule in the grammar in the programming language. A production rule is used to generate an expansion of one of the top-M selected non-terminal symbols. Each expansion creates a new code state (block 1212).

If a new code state is complete, that is, the length of the code state exceeds the maximum number of terminal symbols or the code state matches the suffix (blocks 1214, 1216), then the decoding engine adds the code state to the list of insertion candidates and stops expanding the new code state (isDone is set to false) (blocks 1214, 1216). Otherwise, if the new code state contains only terminal symbols (block 1218), then an additional <statement> non-terminal symbol is added to the new code state and the new code state goes back to block 1206.

When the M*N combinations are evaluated, the top k code states are obtained from the list of insertion candidates based on the highest log probability score and returned to the target environment. The log probability score p represents the accumulated log probabilities, p, ps, and pe, generated for a code state during the first-step beam search and the second-step beam search, where ps is the log probability computed from the non-terminal selector model and pe is the log probability computed by the non-terminal expansion model. (Collectively, block 1220).

Exemplary Operating Environment

Figure 13:
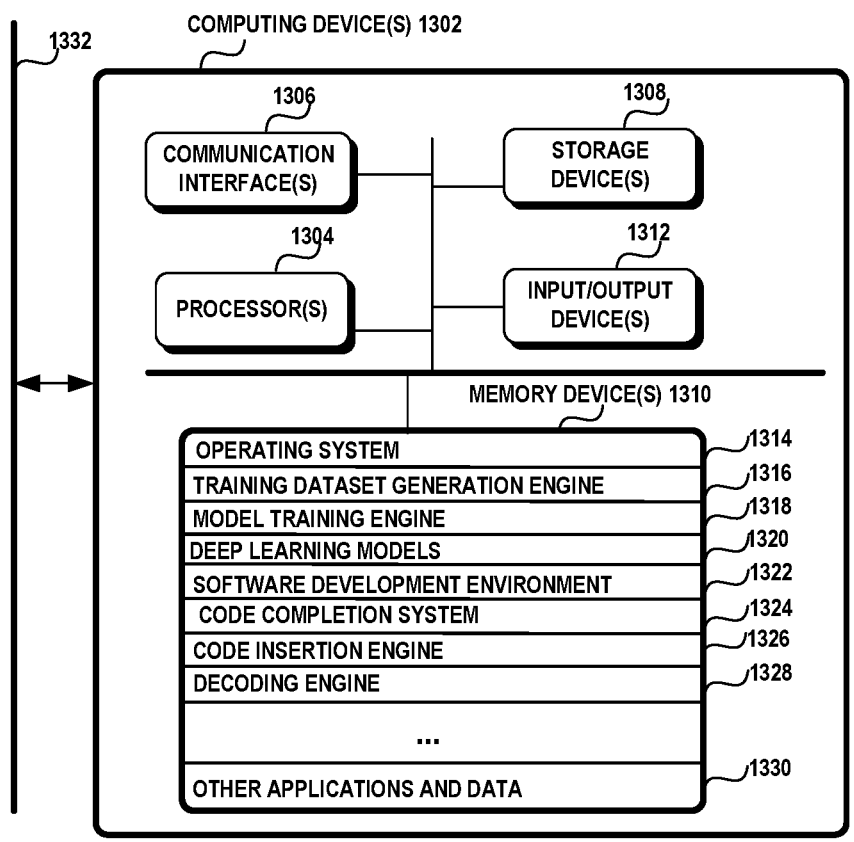
FIG. 13 is a block diagram illustrating an operating environment.

Attention now turns to a discussion of an exemplary operating environment. FIG. 13 illustrates an exemplary operating environment 1300 in which one or more computing devices 1302 are used to train the models of the code insertion engine and use the code insertion engine in a code completion system. However, it should be noted that the aspects disclosed herein is not constrained to any particular configuration of devices. Computing devices 1302 may be configured as a cloud service that generates the models as a service for other code completion systems or offers the code insertion engine with the models as part of a code completion service for users. It should be noted that the operating environment is not limited to any particular configuration and other configurations are possible.

A computing device 1302 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 1000 may be configured in a network environment, a distributed environment, a multi-processor environment, or a stand-alone computing device having access to remote or local storage devices.

A computing device 1302 may include one or more processors 1304, one or more communication interfaces 1306, one or more storage devices 1308, one or more input/output devices 1312, and one or more memory devices 1310. A processor 1304 may be any commercially available or customized processor and may include dual microprocessors and multi-processor architectures. A communication interface 1306 facilitates wired or wireless communications between the computing device 1302 and other devices. A storage device 1308 may be computer-readable medium that does not contain propagating signals, such as modulated data signals transmitted through a carrier wave. Examples of a storage device 1308 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 1308 in the computing devices 1302. The input/output devices 1312 may include a keyboard, mouse, pen, voice input device, touch input device, display, speakers, printers, etc., and any combination thereof.

A memory device or memory 1310 may be any non-transitory computer-readable storage medium that may store executable procedures, applications, and data. The computer-readable storage medium does not pertain to propagated signals, such as modulated data signals transmitted through a carrier wave. The computer-readable storage medium may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 1310 may also include one or more external storage devices or remotely located storage devices that do not pertain to propagated signals, such as modulated data signals transmitted through a carrier wave.

A memory device 1310 may contain instructions, components, and data. A component is a software program that performs a specific function and is otherwise known as a module, program, and/or application. The memory device 1310 may include an operating system 1314, a training dataset generation engine 1316, a model training engine 1318, deep learning models 1320, a software development environment 1322, a code completion system 1324, a code insertion engine 1326, a decoding engine 1328, and other applications and data 1332.

A computing device 1302 may be communicatively coupled via a network 1332. The network 1332 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portion of the Public Switched Telephone Network (PSTN), plain old telephone service (POTS) network, a wireless network, a WiFi® network, or any other type of network or combination of networks.

The network 1332 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of predicting the source code statements to insert between two existing source code segments that are syntactically and semantically-correct with regard to the existing source code usage of the program.

The technical features associated with addressing this problem is the use of the non-terminal selector model and the non-terminal expansion model trained with the surrounding context of an insertion point. A non-terminal expansion model is trained to learn how the non-terminal symbols of the grammar of a programming language are expanded given the surrounding context of an insertion point. The non-terminal selector model is trained to learn how to select the most likely non-terminal symbol to expand given a code insertion state. The surrounding context of an insertion point includes the source code immediately preceding and following the insertion point.

The technical effect achieved is the accuracy in predicting syntactically and semantically-correct source code statements to insert at a target point in the program. The inclusion of the surrounding context to train these models improves the quality of the predicted source code statements such that they are consistent with the existing code usage. This improves the functioning of the computer since more accurate results are achieved with limited resources.

CONCLUSION

A system is disclosed comprising: one or more processors; and a memory that stores one or more programs configured to be executed by the one or more processors. The one or more programs including instructions to perform acts that: detect an insertion point in a source code program during an edit session, wherein the insertion point represents a location where additional source code is to be inserted in between existing source code segments of the source code program; extract a context surrounding the insertion point, the context including a prefix and a suffix of the insertion point; form an input sequence including the prefix, a single non-terminal symbol representing a statement, and the suffix; obtain from a code insertion engine, one or more source code statements to insert at the insertion point that are syntactically correct with the surrounding context, wherein the code insertion engine uses a non-terminal expansion model and a non-terminal selector model to expand the single non-terminal symbol into a sequence of terminal symbols representing the one or more source code statements given the input sequence; and display the one or more source code statements in the source code program.

In one aspect, the one or more programs include instructions to perform acts that: transform the source code program into a concrete syntax tree, wherein the concrete syntax tree includes terminal symbols and non-terminal symbols; extract terminal symbols representing the prefix and terminal symbols representing the suffix; and form the input sequence using the terminal symbols representing the prefix, the single non-terminal symbol representing the statement, and terminal symbols representing the suffix.

In one aspect, the one or more programs include instructions to perform acts that: iteratively expand the single non-terminal symbol representing the statement into one or more new code states until a stop expansion condition exists, wherein each new code state includes an expansion of a selected non-terminal symbol, wherein the non-terminal selector model selects the selected non-terminal symbol of each new code state, wherein the non-terminal expansion model determines a production rule to expand the selected non-terminal symbol.

In one aspect, the one or more programs including instructions to perform acts that: iteratively expand the single non-terminal symbol representing the statement into a new code state that includes all terminal symbols; and generate an additional non-terminal symbol representing a statement to expand into one or more additional statements.

In one aspect, the stop expansion condition includes the stop expansion non-terminal symbol or a maximum length of a code state that has been exceeded. In an aspect, the non-terminal selector model is a multilayer perceptron model. In an aspect, the non-terminal expansion model is a neural transformer model with attention. In an aspect, the single non-terminal symbol representing a statement includes a single statement or a group of statements within a statement block.

A computer-implemented method is disclosed, comprising: representing a source code program during an edit session as a tree of non-terminal symbols and terminal symbols; accessing a code insertion state of the source code program, wherein the code insertion state includes a prefix, an insertion point and a suffix, wherein the insertion point represents a location in the source code program where one or more source code statements are to be inserted in between the prefix and the suffix, wherein the prefix and the suffix represent existing source code segments of the source code program; representing the code insertion state as a sequence of terminal symbols representing the prefix, a single statement non-terminal symbol representing a statement, and a sequence of terminal symbols representing the suffix; expanding the code insertion state into an insertion candidate representing the one or more source code statements to be inserted at the insertion point, wherein the expansion expands the single statement non-terminal symbol representing a statement iteratively into a series of new code states using production rules of a grammar of a programming language of the source code program until a stop expansion condition exists; utilizing a non-terminal selector model to select a non-terminal symbol of each new code state to expand and a non-terminal expansion model to select a production rule to expand the selected non-terminal symbol; and upon detection of the stop expansion condition, presenting the insertion candidate in the source code program.

In an aspect, the computer-implemented method further comprises: appending an additional single statement non-terminal symbol into a new code state when the new code state includes a sequence of terminal symbols and the stop expansion condition has not been detected. In an aspect, the stop expansion condition is based on the terminal symbols of the new code state including the suffix. In an aspect, the stop expansion condition is based on the non-terminal selector model selecting a stop non-terminal symbol. In an aspect, the stop expansion condition is based on a length of a new code state exceeding a maximum length. In an aspect, the non-terminal selector model is a multilayer perceptron model. In an aspect, the non-terminal expansion model is a neural transformer model with attention.

A non-transitory computer-readable storage medium is disclosed having instructions that when executed performs operations, comprising: accessing a non-terminal expansion model to predict a production rule of a grammar of a programming language to expand a non-terminal symbol; accessing a non-terminal selector model to predict a non-terminal symbol to expand; obtaining a code insertion state of a source code program, the code insertion state including an input sequence of terminal symbols representing a prefix, a single non-terminal statement symbol, and terminal symbols representing a suffix, wherein the single non-terminal statement symbol represents a location in the source code program to insert predicted source code statements in between the prefix and the suffix; decoding the single non-terminal statement symbol into the predicted source code statements by iteratively expanding the single non-terminal statement symbol into new code states, a new code state having terminal symbols and zero or more non-terminal symbols, wherein the expansion uses the non-terminal selector model to select a non-terminal symbol to expand at each iteration and the non-terminal expansion model to choose the production rule to expand each selected non-terminal symbol; and generating the predicted source code statements upon expansion of a select one of the new code states into a sequence of all terminal symbols.

In an aspect, the non-transitory computer-readable storage medium includes instructions that when executed performs operations, comprising: upon detecting a new code state having all terminal symbols, expand the new code state to include one or more additional source code statements by appending a second non-terminal statement symbol.

In an aspect, the non-transitory computer-readable storage medium includes instructions that when executed performs operations, comprising: iteratively expanding the second non-terminal statement symbol into one or more additional predicted source code statements.

In an aspect, the non-transitory computer-readable storage medium includes instructions that when executed performs operations, comprising: configuring the non-terminal selector model as a multilayer perceptron model.

In an aspect, the non-transitory computer-readable storage medium includes instructions that when executed performs operations, comprising: configuring the non-terminal expansion model as a neural transformer model with attention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
one or more processors; and
a memory that stores one or more programs configured to be executed by the one or more processors, the one or more programs including instructions to perform acts that:
detect an insertion point in a source code program during an edit session of a source code editor, wherein the insertion point represents a location where additional source code is to be inserted in between existing source code segments of the source code program;

extract a context surrounding the insertion point, the context including a prefix and a suffix of the insertion point;

form an input sequence including the prefix, a single non-terminal symbol representing a statement, and the suffix;

obtain from a code insertion engine, one or more source code statements to insert at the insertion point that are syntactically correct with the surrounding context, wherein the code insertion engine decodes the single non-terminal symbol into a sequence of terminal symbols representing the one or more source code statements to insert at the insertion point, wherein the code insertion engine iteratively selects a position of a non-terminal symbol to expand, wherein the position of the non-terminal symbol to expand is based on an output probability generated from a non-terminal selector model, wherein the code insertion engine expands the selected non-terminal symbol into a code state based on a production rule of a programming language of the source code program, wherein the production rule is determined from an output probability generated by an expansion model, wherein each expansion generates a new code state until a stop expansion condition exists, wherein the non-terminal selector model is a trained neural network model that infers a most likely non-terminal symbol to expand given a current code state, wherein the non-terminal expansion model is a trained neural network model that infers a most likely expansion for the selected non-terminal symbol given the current code state; and display the one or more source code statements in the source code program of the source code editor.

2. The system of claim 1, wherein the one or more programs including instructions to perform acts that:

transform the source code program into a concrete syntax tree, wherein the concrete syntax tree includes terminal symbols and non-terminal symbols;

extract terminal symbols representing the prefix and terminal symbols representing the suffix; and form the input sequence using the terminal symbols representing the prefix, the single non-terminal symbol representing the statement, and terminal symbols representing the suffix.

3. The system of claim 1, wherein the one or more programs including instructions to perform acts that:

upon user input, embed the one or more source code statements into the source code program.

4. The system of claim 1, wherein the one or more programs including instructions to perform acts that:

iteratively expand the single non-terminal symbol representing the statement into a new code state that includes all terminal symbols; and generate an additional non-terminal symbol representing a statement to expand into one or more additional statements.

5. The system of claim 1, wherein the stop expansion condition includes the stop expansion non-terminal symbol or a maximum length of a code state that has been exceeded.

6. The system of claim 1, wherein the non-terminal selector model is a multilayer perceptron model.

7. The system of claim 1, wherein the non-terminal expansion model is a neural transformer model with attention.

8. The system of claim 1, wherein the single non-terminal symbol representing a statement includes a single statement or a group of statements within a statement block.

9. A computer-implemented method, comprising:

representing a source code program during an edit session of a source code editor as a tree of non-terminal symbols and/or terminal symbols;

accessing a code insertion state of the source code program, wherein the code insertion state includes a prefix, an insertion point and a suffix, wherein the insertion point represents a location in the source code program where one or more source code statements are to be inserted in between the prefix and the suffix, wherein the prefix and the suffix represent existing source code segments of the source code program;

transforming the code insertion state into a sequence of terminal symbols representing the prefix, a single statement non-terminal symbol representing a statement, and a sequence of terminal symbols representing the suffix;

decoding the code insertion state into an insertion candidate representing the one or more source code statements to be inserted at the insertion point, wherein the the single statement non-terminal symbol is expanded iteratively into a series of new code states using production rules of a grammar of a programming language of the source code program until a stop expansion condition exists;

selecting a non-terminal symbol of each new code state to expand based on an output probability generated by a non-terminal selector model given a current code state, wherein the non-terminal selector model is a trained neural network model that produces an output probability indicating a most likely non-terminal symbol to expand given a current code state;

expanding the selected non-terminal symbol based on an output probability generated from a non-terminal expansion model given the current code state, wherein the non-terminal expansion model is a trained neural network model that produces an output probability indicating a most likely production rule to expand the selected non-terminal symbol; and upon detection of the stop expansion condition, presenting the insertion candidate in the source code program in the source code editor.

10. The computer-implemented method of claim 9, further comprising:

appending an additional single statement non-terminal symbol into a new code state when the new code state includes a sequence of terminal symbols and the stop expansion condition has not been detected.

11. The computer-implemented method of claim 9, wherein the stop expansion condition is based on the terminal symbols of the new code state including the suffix.

12. The computer-implemented method of claim 9, wherein the stop expansion condition is based on the non-terminal selector model selecting a stop non-terminal symbol.

13. The computer-implemented method of claim 9, wherein the stop expansion condition is based on a length of a new code state exceeding a maximum length.

14. The computer-implemented method of claim 9, wherein the non-terminal selector model is a multilayer perceptron model.

15. The computer-implemented method of claim 9, wherein the non-terminal expansion model is a neural transformer model with attention.

16. A non-transitory computer-readable storage medium having instructions that when executed performs operations, comprising:
- accessing a non-terminal expansion model to predict a production rule of a grammar of a programming language to expand a non-terminal symbol;
- accessing a non-terminal selector model to predict a non-terminal symbol to expand;
- obtaining a code insertion state of a source code program in a source code editor, the code insertion state including an input sequence of terminal symbols representing a prefix, a single non-terminal statement symbol, and terminal symbols representing a suffix, wherein the single non-terminal statement symbol represents a location in the source code program to insert predicted source code statements in between the prefix and the suffix;
- decoding the single non-terminal statement symbol into the predicted source code statements by iteratively expanding the single non-terminal statement symbol into new code states, a new code state having terminal symbols and zero or more non-terminal symbols, wherein the expansion uses the non-terminal selector model to select a non-terminal symbol to expand at each iteration and the non-terminal expansion model to choose the production rule to expand each selected non-terminal symbol, wherein the non-terminal selector model is a trained neural network model that infers a most likely non-terminal symbol to expand given a current code state, wherein the non-terminal expansion model is a trained neural network model that infers a most likely expansion for the selected non-terminal symbol given the current code state;
- generating the predicted source code statements upon expansion of a select one of the new code states into a sequence of all terminal symbols; and
- displaying the predicted source code statements in the source code program in the source code editor.

17. The non-transitory computer-readable storage medium of claim 16 having instructions that when executed performs operations, comprising:
- upon detecting a new code state having all terminal symbols, expand the new code state to include one or more additional source code statements by appending a second non-terminal statement symbol.

18. The non-transitory computer-readable storage medium of claim 17 having instructions that when executed performs operations, comprising:
- iteratively expanding the second non-terminal statement symbol into one or more additional predicted source code statements.

19. The non-transitory computer-readable storage medium of claim 16 having instructions that when executed performs operations, comprising: configuring the non-terminal selector model as a multilayer perceptron model.

20. The non-transitory computer-readable storage medium of claim 16 having instructions that when executed performs operations, comprising: configuring the non-terminal expansion model as a neural transformer model with attention.

* * * * *